(12) United States Patent
Pettey

(10) Patent No.: US 7,664,909 B2
(45) Date of Patent: Feb. 16, 2010

(54) METHOD AND APPARATUS FOR A SHARED I/O SERIAL ATA CONTROLLER

(75) Inventor: Christopher J. Pettey, Cedar Park, TX (US)

(73) Assignee: Nextio, Inc., Austin, TX (US)

( * ) Notice: Subject to any disclaimer, the term of this patent is extended or adjusted under 35 U.S.C. 154(b) by 70 days.

(21) Appl. No.: 10/864,766

(22) Filed: Jun. 9, 2004

(65) Prior Publication Data

US 2005/0027900 A1    Feb. 3, 2005

Related U.S. Application Data

(63) Continuation-in-part of application No. 10/802,532, filed on Mar. 16, 2004, and a continuation-in-part of application No. 10/757,711, filed on Jan. 14, 2004, now Pat. No. 7,103,064, and a continuation-in-part of application No. 10/757,713, filed on Jan. 14, 2004, now Pat. No. 7,457,906, and a continuation-in-part of application No. 10/757,714, filed on Jan. 14, 2004, now Pat. No. 7,046,668.

(60) Provisional application No. 60/464,382, filed on Apr. 18, 2003, provisional application No. 60/491,314, filed on Jul. 30, 2003, provisional application No. 60/515,558, filed on Oct. 29, 2003, provisional application No. 60/523,522, filed on Nov. 19, 2003, provisional application No. 60/541,673, filed on Feb. 4, 2004, provisional application No. 60/555,127, filed on Mar. 22, 2004.

(51) Int. Cl.
  *G06F 12/00* (2006.01)

(52) U.S. Cl. .................. 711/112; 711/147; 710/305

(58) Field of Classification Search ...................... None
See application file for complete search history.

(56) References Cited

U.S. PATENT DOCUMENTS 4,058,672 A    11/1977    Crager et al.

(Continued)

FOREIGN PATENT DOCUMENTS

EP    0574691 A    12/1993

(Continued)

OTHER PUBLICATIONS

Dugan et al. "N Port ID Virtualization." Nov. 29, 2001. Document No. 01-627v0. IBM Corporation. http://www.t11.org.

(Continued)

*Primary Examiner*—Matt Kim
*Assistant Examiner*—Kaushikkumar Patel
(74) *Attorney, Agent, or Firm*—James W. Huffman

(57) ABSTRACT

An apparatus and method is provided for allowing one or more processing complexes to share a disk controller, particularly a serial ATA (SATA) controller. Each processing complex utilizes its own load-store domain to couple to the shared SATA controller, either directly, or indirectly through a shared I/O switch. Ultimately, requests from the processing complexes are presented to the switch with operating system domain header (OSD header) information so that the shared SATA controller can determine which request came from which processing complex, and allocate resources accordingly. Upstream responses from the shared SATA controller include the OSD header so that the shared I/O switch can accurately route the responses to their respective processing complexes. The shared SATA controller includes OSD ID logic to determine the source/result of packets, one or more task files to support multiple processing complexes, and one or more DMA engines to improve performance for requests from multiple processing complexes.

57 Claims, 10 Drawing Sheets

U.S. PATENT DOCUMENTS

| | | | |
|---|---|---|---|
| 5,280,614 A | 1/1994 | Munroe et al. | |
| 5,414,851 A | 5/1995 | Brice, Jr. et al. | |
| 5,581,709 A | 12/1996 | Ito et al. | |
| 5,590,285 A | 12/1996 | Krause et al. | |
| 5,590,301 A | 12/1996 | Guenthner et al. | |
| 5,600,805 A | 2/1997 | Fredericks et al. | |
| 5,623,666 A | 4/1997 | Pike et al. | |
| 5,633,865 A | 5/1997 | Short | |
| 5,758,125 A | 5/1998 | Misinai et al. | |
| 5,761,669 A | 6/1998 | Montague et al. | |
| 5,790,807 A | 8/1998 | Fishler et al. | |
| 5,812,843 A | 9/1998 | Yamazaki et al. | |
| 5,909,564 A | 6/1999 | Alexander et al. | |
| 5,926,833 A | 7/1999 | Rasoulian et al. | |
| 6,009,275 A | 12/1999 | DeKoning et al. | |
| 6,014,669 A | 1/2000 | Slaughter et al. | |
| 6,044,465 A | 3/2000 | Dutcher et al. | |
| 6,055,596 A | 4/2000 | Cepulis | |
| 6,078,964 A | 6/2000 | Ratcliff et al. | |
| 6,112,263 A | 8/2000 | Futral | |
| 6,128,666 A | 10/2000 | Muller et al. | |
| 6,141,707 A * | 10/2000 | Halligan et al. | 710/36 |
| 6,167,052 A | 12/2000 | McNeill et al. | |
| 6,170,025 B1 | 1/2001 | Drottar et al. | |
| 6,240,467 B1 | 5/2001 | Beardsley et al. | |
| 6,247,077 B1 * | 6/2001 | Muller et al. | 710/74 |
| 6,343,324 B1 | 1/2002 | Hubis et al. | |
| 6,421,711 B1 | 7/2002 | Blumenau et al. | |
| 6,484,245 B1 | 11/2002 | Sanada et al. | |
| 6,496,880 B1 | 12/2002 | Ma et al. | |
| 6,507,896 B2 | 1/2003 | Sanada et al. | |
| 6,510,496 B1 | 1/2003 | Tarui et al. | |
| 6,523,096 B2 | 2/2003 | Sanada et al. | |
| 6,535,964 B2 | 3/2003 | Sanada et al. | |
| 6,542,919 B1 | 4/2003 | Wendorf et al. | |
| 6,556,580 B1 | 4/2003 | Wang et al. | |
| 6,615,336 B1 | 9/2003 | Chen et al. | |
| 6,622,153 B1 | 9/2003 | Lee et al. | |
| 6,640,206 B1 | 10/2003 | Callender et al. | |
| 6,662,254 B1 | 12/2003 | Tal et al. | |
| 6,665,304 B2 | 12/2003 | Beck et al. | |
| 6,678,269 B1 | 1/2004 | Michels et al. | |
| 6,728,844 B2 | 4/2004 | Sanada et al. | |
| 6,742,090 B2 | 5/2004 | Sanada et al. | |
| 6,745,281 B1 | 6/2004 | Saegusa | |
| 6,754,755 B1 | 6/2004 | Johnson et al. | |
| 6,760,793 B2 | 7/2004 | Kelley | |
| 6,772,270 B1 | 8/2004 | Kurpanek | |
| 6,779,071 B1 | 8/2004 | Kallat et al. | |
| 6,820,168 B2 * | 11/2004 | Tanaka et al. | 711/6 |
| 6,823,458 B1 | 11/2004 | Lee et al. | |
| 6,834,326 B1 | 12/2004 | Wang et al. | |
| 6,859,825 B1 | 2/2005 | Williams | |
| 6,877,073 B2 | 4/2005 | Sanada et al. | |
| 6,918,060 B2 | 7/2005 | Fanning | |
| 6,944,617 B2 | 9/2005 | Harriman | |
| 6,961,761 B2 | 11/2005 | Masuyama et al. | |
| 7,013,353 B2 | 3/2006 | Parthasarathy et al. | |
| 7,024,510 B2 | 4/2006 | Olarig | |
| 7,082,524 B2 | 7/2006 | Shah | |
| 7,103,064 B2 | 9/2006 | Pettey et al. | |
| 7,136,953 B1 | 11/2006 | Bisson et al. | |
| 7,152,128 B2 | 12/2006 | Wehage et al. | |
| 7,231,486 B2 * | 6/2007 | Ajanovic et al. | 710/315 |
| 7,457,906 B2 | 11/2008 | Pettey et al. | |
| 7,493,416 B2 | 2/2009 | Pettey | |
| 2001/0032280 A1 | 10/2001 | Osakada et al. | |
| 2002/0026558 A1 | 2/2002 | Reuter et al. | |
| 2002/0027906 A1 | 3/2002 | Athreya et al. | |
| 2002/0029319 A1 * | 3/2002 | Robbins et al. | 711/114 |
| 2002/0052914 A1 | 5/2002 | Zalewski et al. | |
| 2002/0072892 A1 | 6/2002 | Shirley | |
| 2002/0078271 A1 | 6/2002 | Berry | |
| 2002/0099901 A1 | 7/2002 | Tanaka et al. | |
| 2002/0126693 A1 | 9/2002 | Stark et al. | |
| 2002/0172195 A1 | 11/2002 | Pekkala et al. | |
| 2002/0186694 A1 | 12/2002 | Mahajan et al. | |
| 2003/0069975 A1 | 4/2003 | Abjanic et al. | |
| 2003/0069993 A1 | 4/2003 | Na et al. | |
| 2003/0079055 A1 | 4/2003 | Chen | |
| 2003/0091037 A1 | 5/2003 | Latif et al. | |
| 2003/0112805 A1 | 6/2003 | Stanton | |
| 2003/0126202 A1 | 7/2003 | Watt | |
| 2003/0131105 A1 | 7/2003 | Czieger et al. | |
| 2003/0158992 A1 | 8/2003 | Ajanovic et al. | |
| 2003/0163341 A1 | 8/2003 | Banerjee et al. | |
| 2003/0188060 A1 | 10/2003 | Van Hensbergen | |
| 2003/0200315 A1 | 10/2003 | Goldenberg et al. | |
| 2003/0200330 A1 | 10/2003 | Oelke et al. | |
| 2003/0204593 A1 | 10/2003 | Brown et al. | |
| 2003/0208531 A1 | 11/2003 | Matters et al. | |
| 2003/0208551 A1 | 11/2003 | Matters et al. | |
| 2003/0208631 A1 | 11/2003 | Matters et al. | |
| 2003/0208632 A1 | 11/2003 | Rimmer | |
| 2003/0208633 A1 | 11/2003 | Rimmer | |
| 2003/0212830 A1 | 11/2003 | Greenblat et al. | |
| 2003/0217183 A1 | 11/2003 | Rimmer et al. | |
| 2003/0235204 A1 | 12/2003 | Azevedo et al. | |
| 2004/0003140 A1 | 1/2004 | Rimmer | |
| 2004/0013092 A1 | 1/2004 | Betker et al. | |
| 2004/0013124 A1 | 1/2004 | Peebles et al. | |
| 2004/0019714 A1 | 1/2004 | Kelley et al. | |
| 2004/0019726 A1 | 1/2004 | Kelley et al. | |
| 2004/0019729 A1 | 1/2004 | Kelley et al. | |
| 2004/0025166 A1 | 2/2004 | Adlung et al. | |
| 2004/0054838 A1 | 3/2004 | Hoese et al. | |
| 2004/0068591 A1 | 4/2004 | Workman et al. | |
| 2004/0073712 A1 | 4/2004 | Larson et al. | |
| 2004/0073716 A1 | 4/2004 | Boom et al. | |
| 2004/0081104 A1 | 4/2004 | Pan et al. | |
| 2004/0088414 A1 | 5/2004 | Flynn et al. | |
| 2004/0098532 A1 | 5/2004 | Huang et al. | |
| 2004/0109460 A1 | 6/2004 | Banks et al. | |
| 2004/0109473 A1 | 6/2004 | Lebizay et al. | |
| 2004/0111559 A1 | 6/2004 | Heil | |
| 2004/0116141 A1 | 6/2004 | Loven et al. | |
| 2004/0117516 A1 | 6/2004 | Date | |
| 2004/0117536 A1 | 6/2004 | Franke et al. | |
| 2004/0117598 A1 | 6/2004 | Arimilli et al. | |
| 2004/0123014 A1 | 6/2004 | Schaefer et al. | |
| 2004/0128410 A1 | 7/2004 | Mayhew et al. | |
| 2004/0165588 A1 | 8/2004 | Pandya | |
| 2004/0186942 A1 | 9/2004 | Olarig | |
| 2004/0213211 A1 | 10/2004 | Green | |
| 2004/0221047 A1 | 11/2004 | Grover et al. | |
| 2004/0233921 A1 | 11/2004 | Krieg et al. | |
| 2004/0249975 A1 | 12/2004 | Tuck et al. | |
| 2005/0050240 A1 | 3/2005 | Wilkins et al. | |
| 2005/0080982 A1 | 4/2005 | Vasilevsky et al. | |
| 2005/0097271 A1 * | 5/2005 | Davies et al. | 711/114 |
| 2005/0114623 A1 | 5/2005 | Craddock et al. | |
| 2005/0169258 A1 | 8/2005 | Millet et al. | |
| 2006/0092928 A1 | 5/2006 | Pike et al. | |
| 2006/0184711 A1 | 8/2006 | Pettey et al. | |

FOREIGN PATENT DOCUMENTS

| | | |
|---|---|---|
| EP | 0935200 | 11/1999 |
| EP | 1115064 A2 | 7/2001 |
| EP | 1376932 A2 | 1/2004 |
| JP | 2002084311 A | 3/2002 |
| JP | 2002183102 A | 6/2002 |
| TW | 545015 | 8/2003 |
| WO | WO94/19749 | 1/1994 |

| | | | |
|---|---|---|---|
| WO | WO9929071 | A1 | 6/1999 |
| WO | WO03085535 | A2 | 10/2003 |

OTHER PUBLICATIONS

Dugan et al. "N_Port Virtualization: Proposed FC-FS Modifications." Jan. 19, 2002. Document No. 02-008v0. IBM Corporation. http://www.t11.org.

American National Standards Institute. "Fibre Channel—Framing and Signaling (FC-FS)." ANSI/INCITS Standard 373-2003. Oct. 22, 2003. pp. 307 and 311. American National Standards Institute, Inc. New York, NY, USA.

Ajay V Bhatt. "Creating a Third Generation I/O Interconnect" Jun. 4, 2003 INTEL, XP002354697 http://www.intel.com/technology/pciexpress/downloads/3rdGenWhitePaper.pdf retrieved on Nov. 15, 2005.

"PCI Express Base Specification." Revision 1.0. PCI-SIG. Apr. 29, 2002. pp. 17-18.

Mehta, Pranav. "Advanced Switching boosts PCI Express." EE Times. CommsDesign. Online Oct. 28, 2002. Retrieved from Internet Nov. 30, 2005. <http://www.commsdesign.com/design_corner/showArticle.jhtml?articleID=16505864>.

Marek Piekarski. "Advanced Switching Interconnect and Blade Server Re-Purposing in the Data Center." Aug. 21, 2004. XP002341367. URL: http://www.asi-sig.org/education/whitepapers/ASWhitePaper_Final_Copy.pdf.

Solomon et al.: "Advanced Switching Architecture", XP002328190. Intel Developer Forum. Sep. 17, 2003. pp. 32-54. Retrieved from the Internet: URL:http://www.asi-sig.org/education/AS_Architecture_and_Pl-8_Overview_-_Spring_IDF_2004_FINAL.pdf.

"XILINX, Designing Network Attached Storage Platform With Advanced Switching" (XP002328191). Sep. 16, 2003. Retrieved from the Internet: URL:http://www.asi-sig.org/education/usage/xilinx_storage_usage.pdf.

Karin S. Puranik: "Advanced Switching Extends PCI Express" XCELL Journal, (XP002328192). Retrieved from the Internet: URL:www.xilinx.com/publications/xcellonline/xcell_47/xc_pdf/xc_pcix47.pdf.

Anonymous: "Fabrics and Application Characteristics for AdvancedTCA Architectures" Intel Technology Journal, vol. 07, No. 04, Nov. 14, 2003 (XP002328193), ISSN: 1535-864X. Retrieved from the Internet: URL:www.intel.com/technology/itj/2003/volume07issue04/art02_fabrics/vol7iss4art02.pdf.

David Mayhew et al. "PCI Express and Advanced Switching: Evolutionary Path to Building Next Generation Interconnects" High Performance Interconnects, 2003. Proceedings. 11th Symposium on Aug. 20-22, 2003, Piscataway, NJ, USA. IEEE, Aug. 20, 2003, pp. 21-29, (XP010657970). ISBN: 0-7695-2012-X.

"Understanding PCI Bus, PCI-Express and Infiniband Architecture" (White Paper); Mellanox Technologies, Inc; 2900 Stender Way, Santa Clara, CA 95054; Document No. 2006WP.

Forouzan, Behrouz A. "Data Communications and Networking, Third Edition." pp. 528-536. McGraw-Hill, 2004, 2001, 1998.

Seifert, Rich. "The Switch Book, The Complete Guide to LAN Switching Technology." pp. 431-473. John Wiley & Sons. 2000.

"Catalyst 3550 Multilayer Switch Software Configuration Guide." Chapter 13, pp. 1-14. Cisco Systems. Apr. 2002.

"802.1Q, IEEE Standards for Local and Metropolitan Area Networks, Virtual Bridged Local Area Networks." IEEE. May 7, 2003.

Holland et al. "Dynamic Switching between One-to-Many Download Methods I "ALL-IP" Cellular Networks" (abstract only) Publication date: May-Jun. 2006.

Kleiman et al. "SunOS on SPARC." (abstract only) Publication Date: Feb. 29-Mar. 3, 1988.

PCI Express Base Specificattion. Rev. 1.0. Apr. 29, 2002.

Cohen et al. "PCI Express Architecture Power Management." Rev 1.1. Nov. 8, 2002.

"Network Interface Controller." FOLDOC—Free On-Line Dictionary of Computing. Http://foldoc.org/index.cgi?query=network+interface+controller. Apr. 11, 2008.

Koellner, Gregory. "NPIV Functionality Profile." Presentation, Jun. 5, 2002. Presentation # T11/02-340v0. Text # T11/02-338v0. www.t11.org.

INCITS working draft proporsed American National Standard for Information Technology, Fibre Channel Framing and Signaling-2 (FC-FS-2). Jan. 16, 2004. Rev. 0.05. pp. i, 65, 67, 76, 80. http://www.t11.org/index.html.

PCI-SIG, PCI Local Bus Specification. Dec. 18, 1998. Revision 2.2, pp. 214-220. http://www.pcisig.com/home.

PCI-SIG, PCI Express Base Specification. Apr. 15, 2003. Revision 1.0a. pp. 27, 259-260. http://www.pcisig.com/home.

PCI-SIG, PCI Local Bus Specification. Dec. 18, 1998. Revision 2.2, pp. 189-220. http://www.pcisig.com/home.

* cited by examiner

SH    Shared Buffer Mode (0=Absolute; 1=Shared)
OSD   OS Domain Number of the Transaction Link Partner (TLP)
R     Reserved

METHOD AND APPARATUS FOR A SHARED I/O SERIAL ATA CONTROLLER

CROSS REFERENCE TO RELATED APPLICATION(S)

This application claims the benefit of the following U.S. Provisional Applications which are hereby incorporated by reference for all purposes:

| Ser. No. | Filing Date | Title |
| --- | --- | --- |
| 60/464,382 (NEXTIO.0103) | Apr. 18, 2003 | SHARED-IO PCI COMPLIANT SWITCH |
| 60/491,314 (NEXTIO.0104) | Jul. 30, 2003 | SHARED NIC BLOCK DIAGRAM |
| 60/515,558 (NEXTIO.0105) | Oct. 29, 2003 | NEXSIS |
| 60/523,522 (NEXTIO.0106) | Nov. 19, 2003 | SWITCH FOR SHARED I/O FABRIC |
| 60/541,673 (NEXTIO.0107) | Feb. 4, 2004 | PCI SHARED I/O WIRE LINE PROTOCOL |
| 60/555,127 (NEXTIO.0108) | Mar. 22, 2004 | PCI EXPRESS SHARED 10 WIRELINE PROTOCOL SPECIFICATION |

This application is a Continuation-in-Part (CIP) of pending U.S. Patent Applications:

| Ser. No. | Filing Date | Title |
| --- | --- | --- |
| 10/757,714 (NEXTIO.0300) now U.S. Pat. No. 7,046,668 | Jan. 14, 2004 | METHOD AND APPARATUS FOR SHARED I/O IN A LOAD/STORE FABRIC |
| 10/757,713 (NEXTIO.0301) now U.S. Pat. No. 7,457,906 | Jan. 14, 2004 | METHOD AND APPARATUS FOR SHARED I/O IN A LOAD/STORE FABRIC |
| 10/757,711 (NEXTIO.0302) now U.S. Pat. No. 7,103,064 | Jan. 14, 2004 | METHOD AND APPARATUS FOR SHARED I/O IN A LOAD/STORE FABRIC |
| 10/802,532 (NEXTIO.0200) | Mar. 16, 2004 | SHARED INPUT/OUTPUT LOAD-STORE ARCHITECTURE | each of which are assigned to a common assignee (NextIO Inc.), and each of which are hereby incorporated by reference for all purposes.

FIELD OF THE INVENTION

This invention relates in general to the field of computer network architecture, and more specifically to an architecture to allow sharing and/or partitioning of network input/output (I/O) endpoint devices in a load/store fabric, particularly a shared serial ATA (SATA) controller.

BACKGROUND OF THE INVENTION

Although the four above referenced pending patent applications have been incorporated by reference, to assist the reader in appreciating the problem to which the present invention is directed, the Background of those applications is substantially repeated below.

Modern computer architecture may be viewed as having three distinct subsystems which when combined, form what most think of when they hear the term computer. These subsystems are: 1) a processing complex; 2) an interface between the processing complex and I/O controllers or devices; and 3) the I/O (i.e., input/output) controllers or devices themselves.

A processing complex may be as simple as a single microprocessor, such as a Pentium microprocessor, coupled to memory. Or, it might be as complex as two or more processors which share memory.

The interface between the processing complex and I/O is commonly known as the chipset. On the north side of the chipset (i.e., between the processing complex and the chipset) is a bus referred to as the HOST bus. The HOST bus is usually a proprietary bus designed to interface to memory, to one or more microprocessors within the processing complex, and to the chipset. On the south side of the chipset are a number of buses which connect the chipset to I/O devices. Examples of such buses include: ISA, EISA, PCI, PCI-X, and AGP.

I/O devices are devices that allow data to be transferred to or from the processing complex through the chipset, on one or more of the buses supported by the chipset. Examples of I/O devices include: graphics cards coupled to a computer display; disk controllers, such as Serial ATA (SATA) or Fiber Channel controllers (which are coupled to hard disk drives or other data storage systems); network controllers (to interface to networks such as Ethernet); USB and Firewire controllers which interface to a variety of devices from digital cameras to external data storage to digital music systems, etc.; and PS/2 controllers for interfacing to keyboards/mice. The I/O devices are designed to connect to the chipset via one of its supported interface buses. For example, modern computers typically couple graphic cards to the chipset via an AGP bus. Ethernet cards, SATA, Fiber Channel, and SCSI (data storage) cards, USB and Firewire controllers all connect to a PCI bus, and PS/2 devices connect to an ISA bus.

One skilled in the art will appreciate that the above description is general. What should be appreciated however, is that regardless of the type of computer, it will include a processing complex for executing instructions, an interface to I/O, and I/O devices to allow the processing complex to communicate with the world outside of itself. This is true whether the computer is an inexpensive desktop in a home, a high-end workstation used for graphics and video editing, or a clustered server which provides database support to hundreds within a large organization.

A problem that has been recognized by the present inventor is that the requirement to place a processing complex, interface and I/O within every computer is costly, and lacks modularity. That is, once a computer is purchased, all of the subsystems are static from the standpoint of the user. The ability to change a processing complex while still utilizing the interface and I/O is extremely difficult. The interface or chipset is typically so tied to the processing complex that swapping one without the other doesn't make sense. And, the I/O is typically integrated within the computer, at least for servers and business desktops, such that upgrade or modification of the I/O is either impossible or cost prohibitive.

An example of the above limitations is considered helpful. A popular network server designed by Dell Computer Corporation is the Dell PowerEdge 1750. This server includes a microprocessor designed by Intel (a Xeon processor), along with memory (e.g., the processing complex). It has a server class chipset for interfacing the processing complex to I/O (e.g., the interface). And, it has onboard graphics for connecting to a display, onboard PS/2 for connecting a mouse/keyboard, onboard RAID control for connecting to data storage, onboard network interface controllers for connecting to 10/100 and 1 gig Ethernet; and a PCI bus for adding other I/O such as SCSI or Fiber Channel controllers. It is believed that none of the onboard features are upgradeable.

So, as mentioned above, one of the problems with this architecture is that if another I/O demand emerges, it is difficult, or cost prohibitive to implement the upgrade. For example, 10 gigabit Ethernet is on the horizon. How can this be easily added to this server? Well, perhaps a 10 gig Ethernet controller could be purchased and inserted onto the PCI bus. Consider a technology infrastructure that included tens or hundreds of these servers. To move to a faster network architecture requires an upgrade to each of the existing servers. This is an extremely cost prohibitive scenario, which is why it is very difficult to upgrade existing network infrastructures.

This one-to-one correspondence between the processing complex, the interface, and the I/O is also costly to the manufacturer. That is, in the example above, much of the I/O is manufactured on the motherboard of the server. To include the I/O on the motherboard is costly to the manufacturer, and ultimately to the end user. If the end user utilizes all of the I/O provided, then s/he is happy. But, if the end user does not wish to utilize the onboard RAID, or the 10/100 Ethernet, then s/he is still required to pay for its inclusion. This is not optimal.

Consider another emerging platform, the blade server. A blade server is essentially a processing complex, an interface, and I/O together on a relatively small printed circuit board that has a backplane connector. The blade is made to be inserted with other blades into a chassis that has a form factor similar to a rack server today. The benefit is that many blades can be located in the same rack space previously required by just one or two rack servers. While blades have seen market growth in some areas, where processing density is a real issue, they have yet to gain significant market share, for many reasons. One of the reasons is cost. That is, blade servers still must provide all of the features of a pedestal or rack server, including a processing complex, an interface to I/O, and I/O. Further, the blade servers must integrate all necessary I/O because they do not have an external bus which would allow them to add other I/O on to them. So, each blade must include such I/O as Ethernet (10/100, and/or 1 gig), and data storage control (SCSI, Fiber Channel, etc.).

One recent development to try and allow multiple processing complexes to separate themselves from I/O devices was introduced by Intel and other vendors. It is called Infiniband. Infiniband is a high-speed serial interconnect designed to provide for multiple, out of the box interconnects. However, it is a switched, channel-based architecture that is not part of the load-store architecture of the processing complex. That is, it uses message passing where the processing complex communicates with a Host-Channel-Adapter (HCA) which then communicates with all downstream devices, such as I/O devices. It is the HCA that handles all the transport to the Infiniband fabric rather than the processing complex. That is, the only device that is within the load/store domain of the processing complex is the HCA. What this means is that you have to leave the processing complex domain to get to your I/O devices. This jump out of processing complex domain (the load/store domain) is one of the things that contributed to Infinibands failure as a solution to shared I/O. According to one industry analyst referring to Infiniband, "[i]t was over-billed, overhyped to be the nirvana for everything server, everything I/O, the solution to every problem you can imagine in the data center . . . but turned out to be more complex and expensive to deploy . . . because it required installing a new cabling system and significant investments in yet another switched high speed serial interconnect".

Thus, the inventor has recognized that separation between the processing complex and its interface, and I/O, should occur, but the separation must not impact either existing operating systems, software, or existing hardware or hardware infrastructures. By breaking apart the processing complex from the I/O, more cost effective and flexible solutions can be introduced.

Further, the inventor has recognized that the solution must not be a channel based architecture, performed outside of the box. Rather, the solution should use a load-store architecture, where the processing complex sends data directly to (or at least architecturally directly) or receives data directly from an I/O device (such as a network controller, or data storage controller). This allows the separation to be accomplished without affecting a network infrastructure or disrupting the operating system.

Therefore, what is needed is an apparatus and method which separates the processing complex and its interface to I/O from the I/O devices.

Further, what is needed is an apparatus and method which allows processing complexes and their interfaces to be designed, manufactured, and sold, without requiring I/O to be included within them.

Additionally, what is needed is an apparatus and method which allows a single I/O device to be shared by multiple processing complexes.

Further, what is needed is an apparatus and method that allows multiple processing complexes to share one or more I/O devices through a common load-store fabric.

Additionally, what is needed is an apparatus and method that provides switching between multiple processing complexes and shared I/O.

Further, what is needed is an apparatus and method that allows multiple processing complexes, each operating independently, and having their own operating system domain, to view shared I/O devices as if the I/O devices were dedicated to them.

And, what is needed is an apparatus and method which allows shared I/O devices to be utilized by different processing complexes without requiring modification to the processing complexes existing operating systems or other software. Of course, one skilled in the art will appreciate that modification of driver software may allow for increased functionality within the shared environment.

The previously filed applications from which this application depends address each of these needs. However, in addition to the above, what is further needed is an I/O device that can be shared by two or more processing complexes using a common load-store fabric.

Further, what is needed is a disk controller which can be shared, or mapped, to one or more processing complexes using a common load-store fabric. Serial ATA (SATA), Serial attached SCSI, and/or RAID controllers are all implementations of a disk controller.

SUMMARY

The present invention provides a method and apparatus for allowing a disk controller to be shared by one or more processing complexes within the load-store domains of the processing complexes.

In one aspect, the present invention provides a shareable disk storage controller to be shared within the load-store architecture of a plurality of operating system domains. The controller includes logic, core logic, and operating system domain identification logic. The logic couples the controller to one or more storage devices. The core logic is coupled to the logic, and manages data transfers to/from the one or more storage devices. The operating system domain identification logic is coupled to the core logic, to receive requests from the plurality of operating system domains, and determine which of the plurality of operating system domains is associated with each of the requests. By determining which of the plurality of operating system domains is associated with each of the requests, the shareable disk storage controller supports requests from each of the plurality of operating system domains.

In another aspect, the present invention provides a Serial ATA (SATA) controller which is shareable by a plurality of processing complexes, allowing each of the plurality of processing complexes to communicate with the controller within their own load-store architecture. The controller includes a plurality of interfaces, core logic, and operating system domain identification logic. The plurality of interfaces couple the controller to a plurality of disk drives. The core logic is coupled to the plurality of interfaces and manages requests for data transfers to/from the plurality of disk drives. The operating system domain identification logic (OSD ID) is coupled to the core logic, to receive requests from the plurality of processing complexes, and to determine for each of the received requests, which processing complex it is associated with.

In a further aspect, the present invention provides a computing environment which allows a first processing complex and a second processing complex to share a Serial ATA (SATA) controller. The SATA controller communicates with each of the first and second processing complexes within their respective load-store domains. The environment includes: at least one disk drive, coupled to the SATA controller; a shared switch, coupled between the processing complexes and the SATA controller, the shared switch associating each packet from the processing complexes with its originating processing complex, and forwarding each packet, along with its association, to the SATA controller. The SATA controller includes operating system domain identification logic (OSD ID) to receive each packet from the shared switch, to determine the association, and to process the packet for its associated processing complex. Neither the first processing complex nor the second processing complex are necessarily aware that they are sharing the SATA controller.

In another aspect, the present invention provides a serial ATA controller which is map-able to one or more processing complexes. The controller includes: one or more interfaces to one or more disk drives; core logic, coupled to the one or more interfaces, and a load-store fabric interface, coupled to the core logic, for interfacing the controller to a load-store fabric that identifies packets with their associated processing complex. The load store fabric interface is configurable to process packets from a first processing complex, the load-store fabric interface is reconfigurable to process packets from a second processing complex.

In yet another aspect, the present invention provides a method for sharing a serial ATA (SATA) controller by a plurality of processing complexes. The method includes: initializing the SATA controller into the load-store resources of each of the plurality of processing complexes; associating packets from each of the plurality of processing complexes with their originating processing complex; transmitting the packets to the SATA controller; identifying for the SATA controller, which of the plurality of processing complexes is associated with the transmitted packets; processing each of the transmitted packets within SATA controller; and associating responses to said processing with their appropriate processing complex.

Other features and advantages of the present invention will become apparent upon study of the remaining portions of the specification and drawings.

DETAILED DESCRIPTION

Although the present invention may be implemented in any of a number of load-store fabrics, the below discussion is provided with particular reference to PCI-Express. One skilled in the art will appreciate that although embodiments of the present invention will be described within the context of PCI Express, a number of alternative, or yet to be developed load/store protocols might be used without departing from the spirit and scope of the present invention.

By way of background, Peripheral Component Interconnect (PCI) was developed in the early 1990's by Intel Corporation as a general I/O architecture to transfer data and instructions faster than the ISA architecture of the time. PCI has gone thru several improvements since that time, with the latest proposal being PCI Express. In a nutshell, PCI Express is a replacement of the PCI and PCI-X bus specification to provide platforms with much greater performance, while using a much lower pin count (Note: PCI and PCI-X are parallel bus architectures, PCI Express is a serial architecture). A complete discussion of PCI Express is beyond the scope of this specification, but a thorough background and description can be found in the following books which are incorporated herein by reference for all purposes: *Introduction to PCI Express, A Hardware and Software Developer's Guide*, by Adam Wilen, Justin Schade, Ron Thornburg; *The Complete PCI Express Reference, Design Insights for Hardware and Software Developers*, by Edward Solari and Brad Congdon; and *PCI Express System Architecture*, by Ravi Budruk, Don Anderson, Tom Shanley; all of which are available at www.amazon.com. In addition, the PCI Express specification is managed and disseminated through the Special Interest Group (SIG) for PCI found at www.pcisig.com.

This invention is also directed at a shared disk controller that implements the Serial ATA Storage Architecture. Background on SATA technology can be found in "Serial ATA Storage Architecture and Applications", by Knut Grimsrud and Hubbert Smith, Intel Press, which is hereby incorporated by reference.

Figure 1:
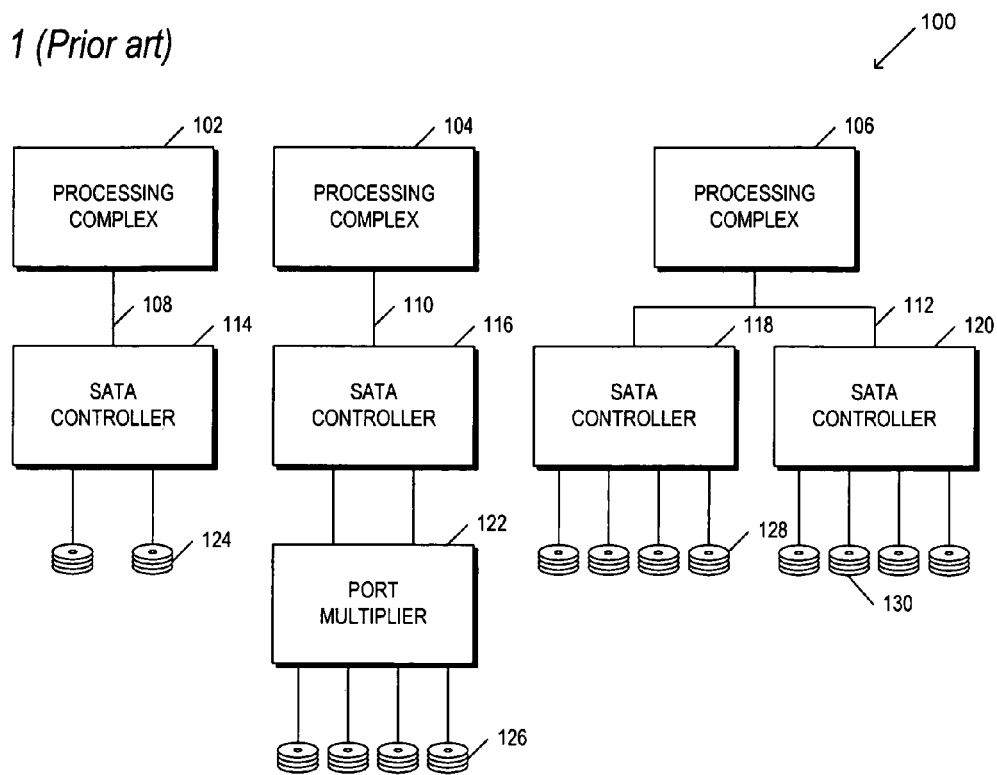
FIG. 1 is prior art block diagram of three processing complexes each with their own serial ATA (SATA) controller.

Referring now to FIG. 1, a block diagram 100 is provided illustrating three processing complexes 102, 104, 106, each having one or more disk controllers, in this case Serial ATA (SATA) controllers 114, 116, 118, 120 for coupling the processing complexes 102, 104, 106 to their respective disk drives 124. More specifically, processing complex 102 is coupled to SATA controller 114 via a load-store bus 108, which provides access to two disk drives 124. The bus 108 may be any common bus such as PCI, PCI-X, or PCI-Express. Moreover, one skilled in the art will appreciate (although not shown) that the SATA controller 114 may present the two hard disks 124 as separate drives to the processing complex 102, or as a single drive which utilizes a RAID configuration appropriate for two drives (Raid 0, or Raid 1). Processing complex 104 is coupled to SATA 116 via load-store bus 110. The SATA controller 116 is in turn coupled to port multiplier 122 which provides port replication necessary for SATA controller 116 to access four disk drives 126. Processing complex 106 is coupled to two SATA controllers 118, 120 via load store bus 112. The SATA controllers 118, 120 are coupled to disk drives 128, 130. What should be appreciated by the Prior art illustration and discussion with respect to FIG. 1, is that each processing complex 102, 104, 106 requires its own SATA controller 114, 116, 118-120, respectively, to access its disk drives 124, 126, 128-130.

Figure 2:
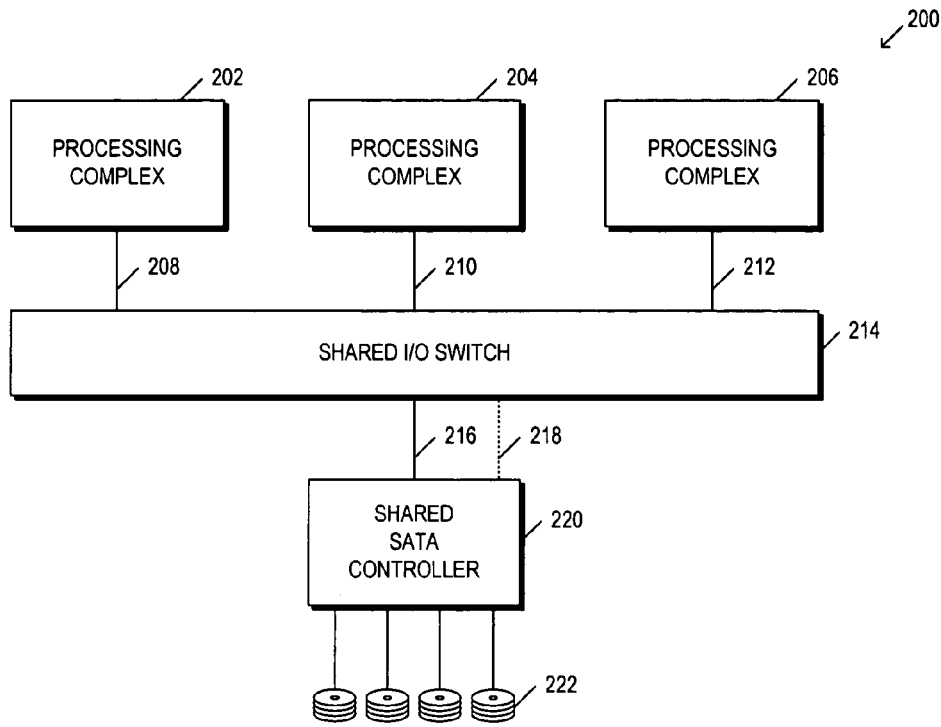
FIG. 2 is a block diagram of three processing complexes sharing a shared SATA controller via a shared I/O switch according to the present invention.

Referring now to FIG. 2, a block diagram 200 is shown which implements one embodiment of the present invention. More specifically, three processing complexes 202, 204, 206 are shown, each with their own load-store bus 208, 210, 212, coupled to a shared I/O switch 214. The shared I/O switch 214 is coupled to a shared SATA controller 220 via an operating system domain (OSD) aware load-store bus 216. The shared SATA controller 220 is coupled to disk drives 222. In an alternative embodiment, the shared I/O switch 214 is coupled to the shared SATA controller 220 via a non OSD aware load-store bus 216, the same as or similar to the load-store links 208, 210, 212, and additionally by an OSD identifier bus 218.

As mentioned above, a processing complex may be as simple as a single microprocessor, such as a Pentium microprocessor, coupled to memory, or it might be as complex as two or more processors which share memory. The processing complex may execute a single operating system, or may execute multiple operating systems which share memory. In either case, applicant intends that from the viewpoint of the shared I/O switch 214, that whatever configuration of the processing complex, each load-store bus 208, 210, 212 be considered a separate operating system domain (OSD). Specifics of one embodiment of an OSD will be described below with respect to FIGS. 10-11. At this point, it is sufficient that the reader understand that in the environment described with reference to FIG. 2, the load-store links 208, 210, 212 do not carry information to the shared I/O switch 214 that particularly associates the information with themselves. Rather, they utilize load-store links 208, 210, 212 as if they were attached directly to a dedicated SATA controller. The shared I/O switch 214 receives requests, and or data, (typically in the form of packets), over each of the load-store links 208, 210, 212. In the example of FIG. 2, the shared I/O switch 214 illustrates three upstream ports 208, 210, 212 coupled to the load-store links 208, 210, 212 which are non OSD aware, and one downstream port 216 coupled to an OSD aware load-store link 216. Although not shown, within the shared I/O switch 214 is a core, and mapping logic which tags, or associates packets received on the non OSD aware links 208, 210, 212 with their respective OSD. The shared I/O switch 214 then provides those packets to the downstream OSD aware link 216 with embedded information to associate those packets with their upstream link 208, 210, 212. Alternatively, the information to associate those packets with their upstream link 208, 210, 212 can be provided out of band via link 218. In either embodiment, the shared SATA controller 220 receives the OSD aware information via link 216 so that it can process the information, per OSD.

In the reverse, when information flows from the shared SATA controller 220 to the shared I/O switch 214, the information is associated with the appropriate upstream link 208, 210, 212 by embedding (or providing out of band), OSD association for each piece of information (e.g., packet) transmitted over the link 216. The shared I/O switch 214 receives the OSD aware information via the link 216, determines which upstream port the information should be transmitted on, and then transmits the information on the associated link 208, 210, 212.

What should be appreciated by reference to FIG. 2 is that three processing complexes 202, 204, 206 all share the same shared SATA controller 220, which then provides them with access to one or more disk drives 222 (either shared or not shared). Complete details of the links 208, 210, 212 between the processing complexes 202, 204, 206 and the shared I/O switch 214 are provided in the parent applications which are referenced above and incorporated by reference. Those applications further describe the link 216, although one embodiment of such link will be described below with reference to FIGS. 11-13. Attention will now be focused on the downstream OSD aware shared endpoint, particularly, embodiments of the shared SATA controller 220.

Figure 3A:
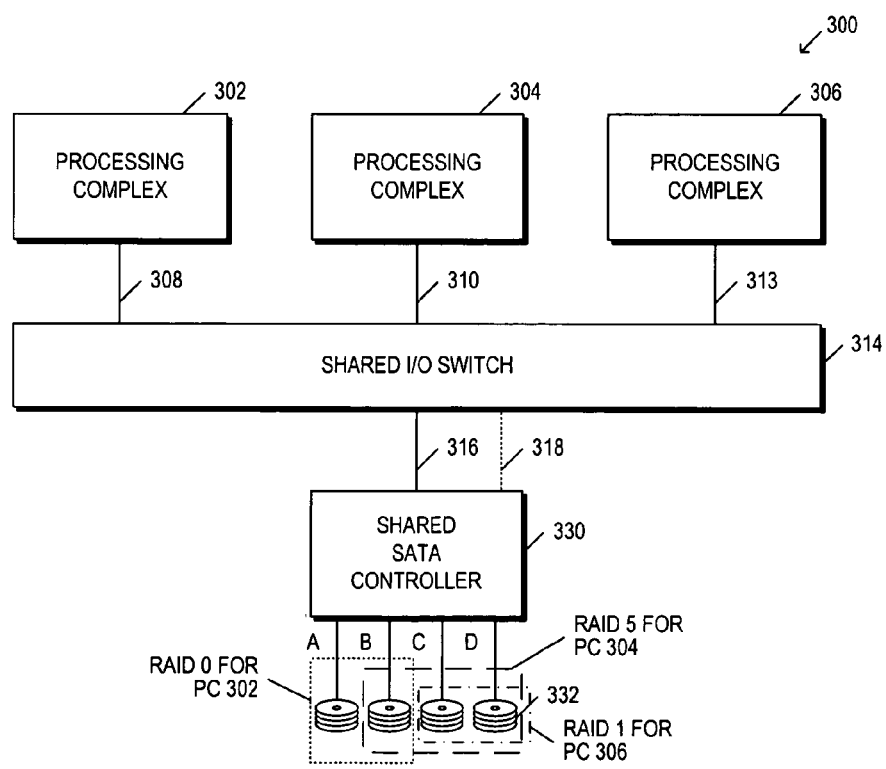
FIGS. 3A-B are block diagrams of three processing complexes sharing SATA disk drives through a single shared SATA controller according to the present invention.

Referring now to FIG. 3A, a block diagram 300 is shown, substantially similar in architecture to the environment described above with respect to FIG. 2. What is particularly called out, however, is an arrangement by the shared SATA controller 330 for sharing the disk drives 332. More specifically, four disk drives 332 are shown labeled A, B, C and D, each coupled via an SATA link to the shared SATA controller 330. Array control (not shown) within the shared SATA controller 330 has configured drives A and B (or at least a portion of drive B) in a RAID 0 configuration for processing complex 302. Array control has also configured portions of drives C and D (sectors/LUNs) in a RAID 1 configuration for processing complex 306. Further, drives B, C, D are configured in a RAID 5 configuration for processing complex 306. Thus, the shared SATA controller 330 has not only allowed three processing complexes 302, 304, 306 to share a single controller, but additionally has allowed multiple processing complexes to be presented with different/disparate logical drive configurations, each of which is viewed, from the standpoint of the processing complexes, as a physical drive or drives.

In operation, when the processing complex 302 executes a load instruction (or otherwise performs a load operation), and the data associated with the load is not in the memory of the processing complex 302, the data must be retrieved from the disk(s) that have been configured for the processing complex 302. In one embodiment, the operating system of processing complex 302 transmits a read request via its link 308 to the shared SATA controller 330 to notify it that the processing complex 302 requires servicing. When the shared I/O switch 314 receives the read request (or packet), it associates the packet with the link 308 prior to transferring it to the shared SATA controller 330. One skilled in the art will appreciate that other mechanisms may be used to make the shared SATA controller 330 aware of a pending request. For example, the processing complex 302 may simply update a pointer within the shared SATA controller 330 to indicate that a request has been placed within memory of the processing complex 302, and that the shared SATA controller 330 needs to download the request. Further, the shared SATA controller 330 may regularly poll memory within the processing complex 302 to determine whether any outstanding requests exist. One skilled in the art will appreciate that the mechanism for providing notification of an outstanding request from the processing complex 302 to the shared SATA controller 330 can vary with the design of the shared SATA controller 330, and the driver within the processing complex 302 that talks to it.

The shared SATA controller 330 receives the packet via its link 316, interprets the packet as a request for the processing complex 302, services the request, and provides the response to the request by embedding an association with each packet via the link 316 (or out-of-band on link 318). The shared I/O switch 314 receives the response, determines the upstream port appropriate for the response, strips off the OSD association, and transmits the response back to the originating processing complex 302 via link 302. Loads and stores from the other processing complexes 304, 306 operate in a similar fashion.

In one embodiment, the shared SATA controller 330 may simply configure the disk drives 332 distinctly, so that any particular drive, or set of drives, are accessed by only one processing complex 302. Alternatively, the shared SATA controller 330 may contain resources to allow a particular disk drive, or set of drives, to be shared as shown. Either embodiment is contemplated by the inventor.

Figure 3B:
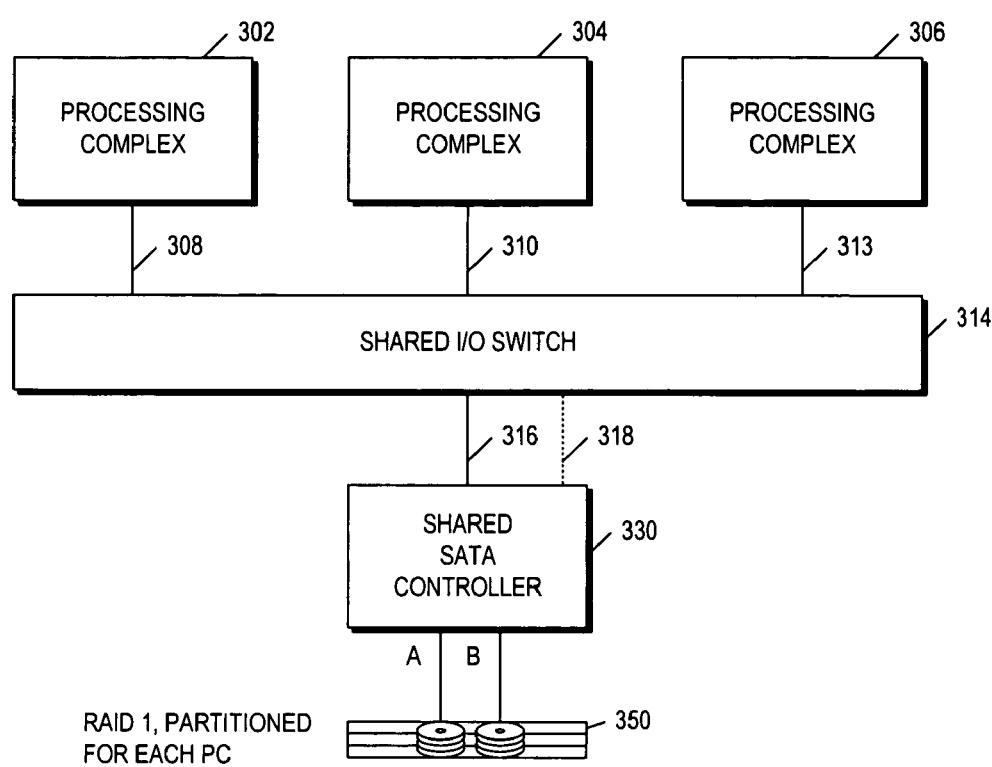

Referring now to FIG. 3B, a block diagram is shown similar to that described above with respect to FIG. 3A, like elements having like numerical identifiers. What is particularly illustrated are two physical SATA drives to provide storage for the three processing complexes 302, 304, 306. More specifically, array control (not shown) within the shared SATA controller 330 has partitioned the two drives A and B into three RAID 1 arrays. For example, if each of the SATA drives A and B are 120 gigabyte drives, then 120 gig of storage is available to the controller 330 in a RAID 1 (redundant/mirrored) configuration. Array control within the shared SATA controller creates three 40 gig RAID 1 arrays 350, and maps the first array to processing complex 302, the second array to processing complex 304, and the third array to processing complex 306. In the prior art illustrated in FIG. 1, each processing complex would have had to have had its own SATA controller, and its own dedicated SATA drive. Moreover, to provide redundancy or mirroring, each processing complex would have had to have its own SATA controller, an at least two of its own SATA drives. Thus, to provide a minimal RAID 1 configuration for three processing complexes would have required three SATA controllers and six SATA drives. However, in the example shown in FIG. 3B, a fully redundant, mirrored RAID 1 configuration has been provided to three complexes using just one shared SATA controller, and just two SATA drives.

What has been illustrated in FIGS. 3A-B is a shared SATA controller that supports three processing complexes and two or four SATA drives. However, one skilled in the art should appreciate that the number of processing complexes, and number of SATA drives shown are exemplary only. The inventor contemplates a shared SATA controller that can support N processing complexes and M SATA drives. One embodiment of the shared SATA controller of the present invention is intended to be incorporated into a blade server environment. In today's blade environment, each blade requires its own hard drive to reside on the blade, to hold its operating system, swap space, etc. So, in an eight-blade chassis, eight hard drives are required, and eight disk controllers. None of those hard drives are hot pluggable since they are installed directly on the blade, and none of the hard disk solutions provide for any RAID configurations. Thus, if a hard drive fails on a blade, the entire blade fails.

What is envisioned by the inventor is the use of the shared SATA controller (or a shared serial attached SCSI controller), with two or more SATA drives configured in a RAID configuration, and partitioned for use by each blade. For example, two 200 gigabyte SATA drives could be configured in a RAID 1 configuration, and partitioned into eight 25 gig partitions, one for each of the blade servers. In this instance, full mirroring of data, which may be hot pluggable, is provided for all eight blade servers by using the shared SATA controller of the present invention, and just two SATA (or serial attached SCSI) drives. If one of those drives fails, the mirroring allows each of the blade servers to continue operating. The inventor believes that such an implementation is significantly more cost effective than what is known today, because of the reduction in the number of disk drives necessary to support eight blades, as well as the number of disk controllers, but also because of the increased reliability, and the reduced heat generated by the drives. Details of the shared SATA controller 330 will be further described below with reference to FIG. 6, but first, another illustration of the use of the present invention is considered helpful.

Figure 4:
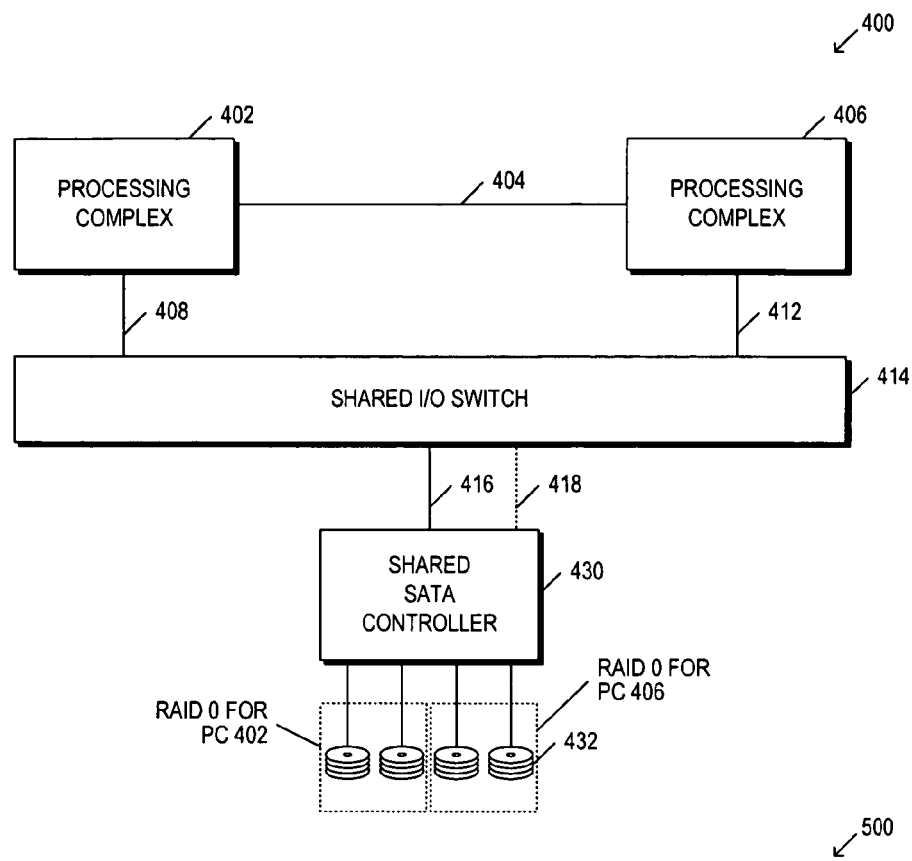
FIG. 4 is block diagram of two redundant processing complexes sharing disk drives through a shared SATA controller according to the present invention.

Referring now to FIG. 4, a block diagram of one embodiment of the present invention is shown. Particularly, two processing complexes 402, 406 are shown connected to a shared I/O switch 414 via load-store links 408, 412, respectively. In addition, processing complex 402 is connected to processing complex 406 via a link 404. This embodiment is shown to illustrate a redundant, or mirrored pair of processing complexes (or servers) executing the same operating system, instructions, etc. Such an arrangement, north of the shared I/O switch 414 is common in the industry. However, the prior art would have each of the processing complexes 402, 406 coupled to their own SATA controller, and their own disk drives. But, by utilizing the shared aspect of the present invention, an improvement is made as will now be addressed.

The shared SATA controller 430 is coupled to the shared I/O switch via OSD aware load-store link 416. The shared SATA controller is also coupled to four disk drives, two of which are in a RAID 0 (or RAID 1) configuration for processing complex 402, and two of which are in a RAID 0 (or RAID 1) configuration for processing complex 406. One skilled in the art will appreciate that the array configuration of disk drives to the processing complex is not the important issue. Rather, it is the sharing of the shared SATA controller 430 by multiple processing complexes to which the invention is directed. However, in the mirrored configuration illustrated in FIG. 4, it is contemplated that whatever array structure is established for processing complex 402, the same structure is replicated for processing complex 406.

In one embodiment, if processing complex 402 fails, processing complex 406 is alerted of the failure via link 404. When processing complex 406 recognizes that processing complex 402 has failed, it would be advantageous for it to be able to perform stores not only to the disk drives that are configured for it, but also for the disk drives that have previously been allocated to the processing complex 402. If such stores can be written to both sets of disk drives 432, then when processing complex 402 is replaced (typically in a hot-pluggable blade environment), then delays typically associated with "mirroring" disk sets, is avoided. Processing complex 406 communicates to the shared SATA controller 430 that processing complex 402 has failed, and that it now wishes to perform any stores to its array, and to the array previously configured for processing complex 402. Thus, the shared SATA controller can now perform the writes to both sets of disk drives 432 on behalf of processing complex 406.

In an additional embodiment, if the shared SATA controller 430 is configured to allow such "mirrored" reallocation of resources, it could also allow for loads to be provided to the live processing complex (i.e., 406) by both sets of disk drives. That is, reads could effectively be provided to the processing complex 406 by its array, and by the array previously configured to support processing complex 402, thereby doubling load performance from the disk drives. Without the ability to share the shared SATA controller 430, the inventor is unaware of any way to provide this configuration.

Figure 5:
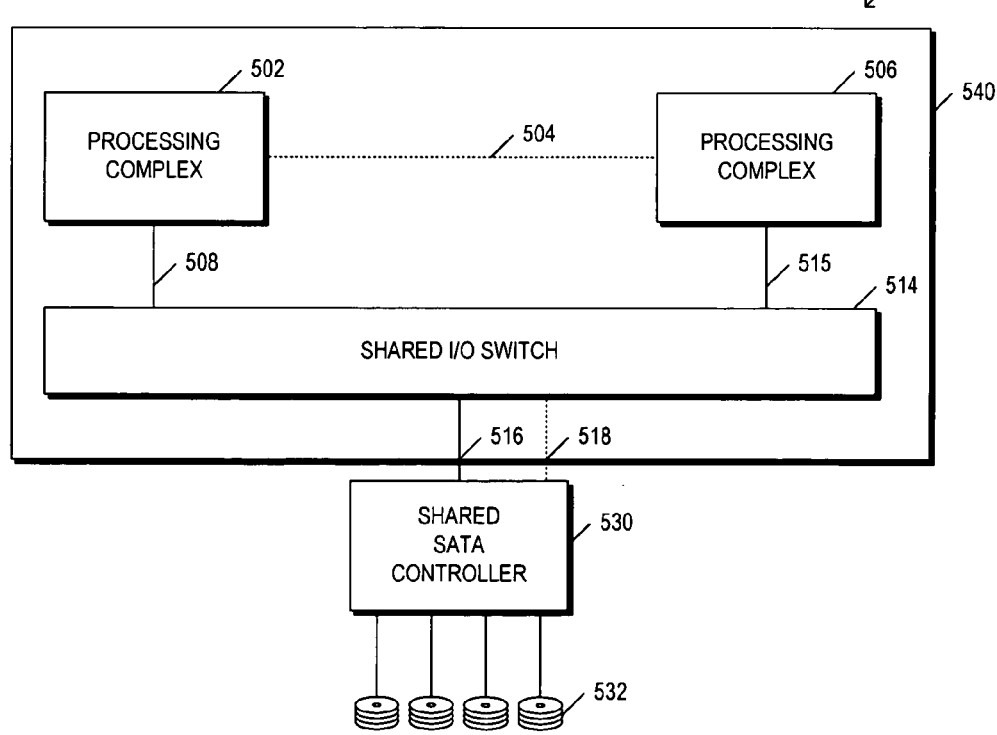
FIG. 5 is a block diagram illustrating two processing complexes and a shared I/O switch in a system on-chip (SOC) environment, sharing a shared SATA controller.

Referring now to FIG. 5, a block diagram 500 is shown, similar to that shown above in FIG. 4. However the processing complexes 502, 504 are configured together, along with the shared I/O switch 514 in a system-on-chip (SOC) system 540. The SOC 540 is then coupled to the shared SATA controller 530 as described above. What should be appreciated in FIG. 5 is that the inventor contemplates that one or more processing complexes 502, 506 can be provided in an SOC, and that the shared I/O switch 514 that provides a downstream OSD aware load-store link 516, may be incorporated into the SOC. One skilled in the art can also appreciate that the shared I/O switch 514 may also be included in one or more processing complexes 502, 504. The particular arrangement or number of processing complexes 502, 506, and location of the shared I/O switch 514, are not important to the present invention. Rather, it is the ability to share an endpoint, such as the shared SATA controller, via an OSD aware link 516 (or non OSD aware link along with an out-of-band association link 518) to which the invention is directed.

Figure 6:
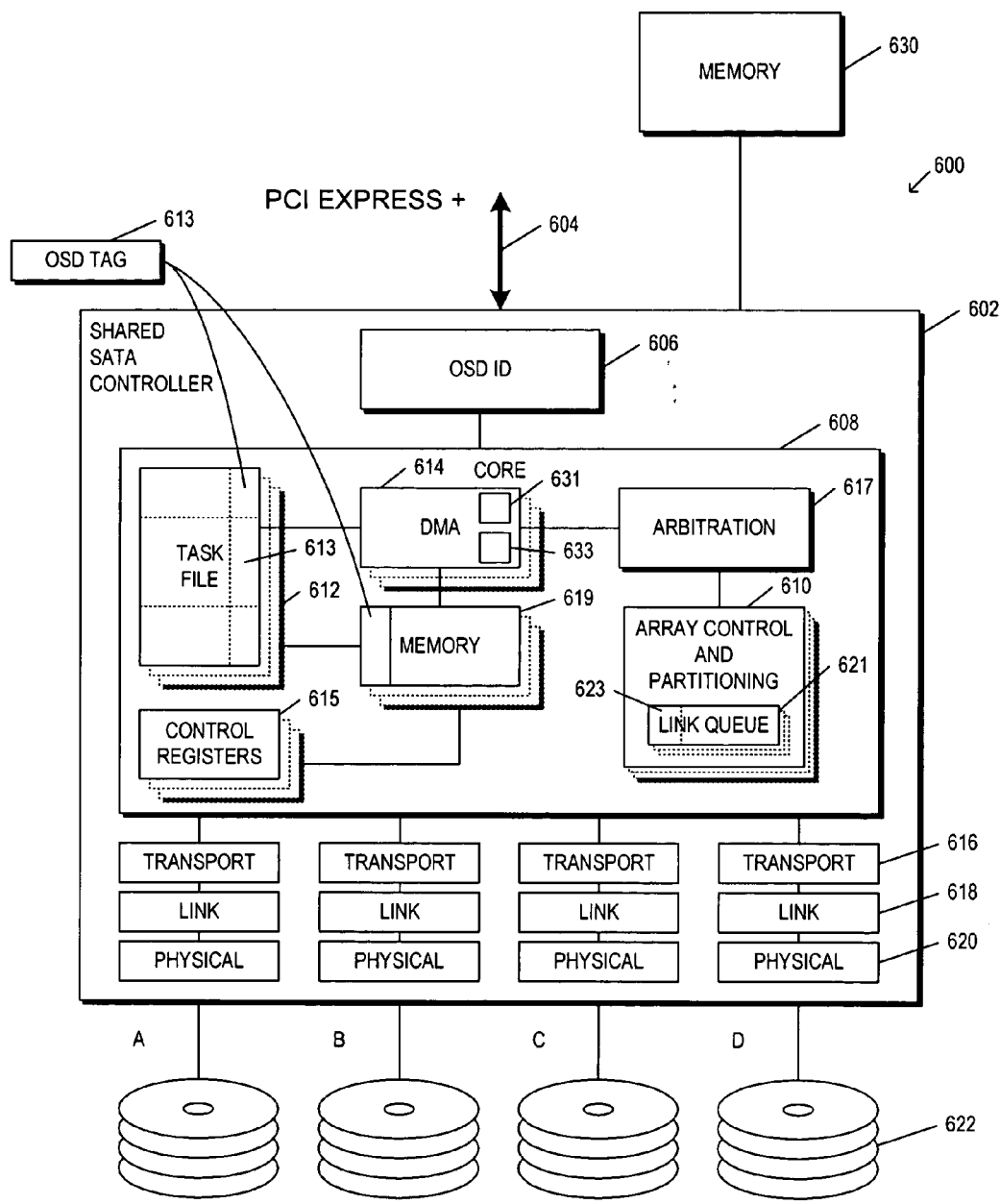
FIG. 6 is an architectural diagram illustrating a shared SATA controller according to one embodiment of the present invention.

Referring now to FIG. 6, a block diagram 600 of a shared SATA controller 602 according to the present invention is shown. More particularly the shared SATA controller 602 is coupled to an upstream load-store link 604 which is OSD aware. In one embodiment, the upstream link 604 is a PCI Express+ link which is thoroughly described in the parent applications, although other load-store links are contemplated. The OSD aware load-store link 604 is coupled to OSD ID logic 606. The purpose of this logic is to view incoming packets, and determine which upstream OSD is associated with the packets. The OSD ID logic 606 is also responsible for associating response packets with their upstream requester.

The OSD ID logic 606 is coupled to core logic 608. The core logic 608 is the processing engine of the shared SATA controller 602, and performs such tasks as: 1) association of both tasks (reads/writes) and data transfers with particular OSD's; 2) association of virtual drive mapping(s) per OSD with physical drives or links; 3) queuing of work, either per physical link and/or per OSD; 4) tracking of responses from physical links to each OSD; and 5) arbitration of a) resources; b) memory; c) DMA; queuing of reads/writes on the physical links. How the core logic 608 performs these various functions will now be described.

Within the core logic 608 is one or more task files 612. The purpose of the task file(s) 612 is to store tasks generated by the OSD's (or processing complexes as described above). In a non-shared SATA controller, a single task file 612 is used to store tasks (such as reads/writes) for its processing complex. However, within the shared SATA controller of the present invention, it is necessary to associate outstanding tasks with their originating OSD. This can be accomplished in many ways. In one embodiment, multiple task files 612 are provided, one for each OSD supported by the shared SATA controller 602. Thus, when a packet is received by the shared SATA controller 602, the OSD ID logic 606 determines which OSD the task is associated with, and communicates this to the core logic 608 so that the task may be placed in the task file 612 associated with its OSD. In an alternative embodiment, one or more task files 612 are provided which contain memory space to store an OSD TAG 613 for outstanding tasks. Thus, rather than storing tasks in separate task files (i.e., one for each OSD), tasks received by the shared SATA controller 602 are stored together, with each task tagged with its associated OSD. One skilled in the art will appreciate that it is not the structure of the task file 612 that is important. Rather, it is the association of tasks with their OSD that is important, and is required to provide a SATA controller which can be shared by multiple OSD's.

Moreover, it should be appreciated that the shared SATA controller 602 of the present invention need not necessarily increase the size of the task file(s) 612. That is, the size of the task file(s) 612 is not dependent on the number of OSD's supported by the shared SATA controller 602, but rather on the performance specified by the designer. Thus, in one embodiment, the task file 612 could be a single register, operating on one task at a time. Or, in an alternative embodiment, the task file 612 could be designed to accommodate a static number of outstanding tasks from the multiple OSD's. In this embodiment, arbitration logic 617 would be used to manage fairness of task file 612 resources to the OSD's, and arbitrate between existing tasks in the task file 612. Another embodiment envisions dynamic allocation of a memory, such as the memory 619 for use as a task file 612 as needed from moment to moment by the OSD's. All such configurations are envisioned by the present inventor.

The core logic 608 further includes one or more sets of control registers 615. In a non-shared SATA controller, two sets of control registers are provided to provide communication with its processing complex. The first set of control registers are necessary for configuration to the load/store link 604 such as PCI Express and are defined by the PCI Specification. The second set of control registers are specific to the controller, and are particular to the OSD supported. It is common in controllers today to implement these registers using flip flops to allow for quick response. However, when providing a shared SATA controller 602, some of the first set of control registers are common to all OSD's, and some are specific to each OSD supported. In addition, some of the second set of control registers are common to all OSD's and some are specific to each OSD supported. The present invention allows the control registers 615 (which is inclusive of both sets of control registers discussed above) to be implemented in flip flops. However, because of the potential die size impact of increasing the control registers 615 per OSD, a portion of the memory 619 is used to store OSD specific control registers. Thus, the control registers 615 could either be implemented with flip flops, or high speed memory, in combination with the memory 619 where the control registers 615 act as a cache for the control register information stored in the memory 619, or with SRAM/DRAM which would not be a cache for 619. In an alternative embodiment, off controller memory 630 is further utilized to store increased number of control registers to support additional OSD's. One skilled in the art will appreciate that the number of OSD's supported by the shared SATA controller 602, and the architecture of additional control registers 615 is strictly a design concern, with respect to die size impact and performance. The necessary additional control registers to support multiple OSD's can be made by increasing the number of control registers 615, by allocating a portion of the memory 619 to store additional control register information on the controller 602, by utilizing off controller memory 630, or any combination thereof.

The task file(s) 612 are shown coupled to one or more DMA engines 614. It is the DMA engines 614 that are responsible for moving requests, and/or data, to/from the disk drives 622. The DMA engines 614 also move requests and/or data to/from the load-store link 604. It is contemplated that the number of DMA engines 614 provided within the shared SATA controller 602 are dependent on the performance desired by the manufacture, but should not be necessarily related to the number of processing complexes (or OSD's) supported. That is, a shared SATA controller may support six OSD's, but only have two DMA engines. It is the responsibility of the core logic 608, and particularly the arbitration logic 617, to provide arbitration of the DMA engines 614 for requests from the multiple OSD's. Within the DMA engines 614 are timing logic 631 and request tables 633. In one embodiment, the timing logic 631 monitors outstanding requests, per OSD, to insure that pending requests are terminated in a timely fashion. For example, if a request to a particular OSD does not receive a response, other requests should not be held up indefinitely. Rather, the request should be cancelled, and reported to the OSD, to allow other requests to proceed. Further, if a determination is made by the DMA engines 614 that an OSD is not responding, all pending requests within the task file 612 should be cancelled. The timing/management control 631 is responsible for the monitoring of requests that are outstanding, as well as those pending within the task file 612, and for managing and/or terminating requests should a problem occur.

The DMA engine(s) 614 also contain one or more lookup tables 633 to associate outstanding requests with particular OSD's. Within a non shared environment, pending requests are tagged so that responses can be related to their associated request. However, within the shared environment of the present invention, in addition to tagging outstanding requests with a request identifier, the requests are also tagged with their associated OSD. This is necessary because it is possible for requests from different OSD's to have the same request identifier. Thus, when responses come in to the shared SATA controller 602, the responses contain both a sequence tag and an OSD identifier. The DMA engine(s) use table 633 to correlate responses with requests, per OSD. As mentioned above, the number of DMA engine(s) 614 provided, and the number of outstanding requests each are capable of, is a design consideration respecting performance. Thus, a shared SATA controller 602 may be built with a single DMA engine 614 that is only capable of issuing one request at a time. Alternatively, a shared SATA controller 602 may be built with multiple DMA engines 614, each of which is capable of having multiple outstanding requests. Any combination is envisioned by the present inventor. What is important is that the DMA engine(s) 614 be capable of associating responses with particular requests, per OSD.

The DMA engine(s) 614 are shown coupled to one or more memories 619. Within a non-shared SATA controller, memory space is provided as intermediate storage for requests and/or data DMA'ed to the physical drives, or responses and/or data DMA'ed from the physical drives. Within the shared SATA controller 602 of the present invention, separate memory space 619 could be provided for each OSD to store requests, responses and data for that OSD. Or, alternatively, memory space could be provided to support DMA activity for all OSD's by providing an OSD tag 613 for each request, response and data, and placing such requests, responses, data for all OSD's within a common memory 619. Moreover, this memory 619 may be placed entirely within the shared SATA controller 602, partially on the shared SATA controller 602 and partially in memory outside the SATA controller 602, or entirely outside the shared SATA controller 602. The arrangement of the memory 619, or its location, are not important to the present invention. Rather, it is the provision of memory in such a manner as to allow requests, responses, and/or data that is DMA'ed, to be associated with its OSD that is important.

The core logic 608 also contains one or more array control and partitioning logic blocks 610. As mentioned above, it is contemplated that within the shared SATA controller 602, it may be configured to support one or more processing complexes (or OSD's), each of which may have one or more sets of disk drives configured in an array. That is, there need not be a direct correlation between the number of OSD's supported by the shared SATA controller 602, and the number of array control logic blocks 610. For example, the shared SATA controller 602 may support four independent OSD's, while only allowing two of those to utilize a RAID configuration. The array control and partitioning logic also provides for virtual partitioning of physical sectors and/or LUN's for each of the physical drives 622. For example, a single physical drive 622 may be dedicated to a single OSD, either as a physical drive, or as part of an array. Alternatively, a single physical drive 622 may be partitioned into two or more virtual drives, each of which may then be presented as a physical drive to an OSD, or as part of an array to an OSD.

For example, referring briefly back to FIG. 3A, physical drive A is not partitioned, but it presented to the array control block 610 in its entirety. Drive B however is partitioned into two virtual drives. The first virtual drive is presented to array control block 610 to be used in the RAID 0 array created for processing complex 302. The second virtual drive for physical drive B is presented to the array control block 610 (or a second array control block 610) to be used as one of the three drives in the RAID 5 configuration for processing complex 304. Drive C is partitioned into two virtual drives. The first virtual drive within physical drive C is presented to array control as one of the three drives for the RAID 5 configuration for processing complex 304. The second virtual drive within physical drive C is presented to array control as one of two drives for the RAID 1 array for processing complex 306. Drive D is partitioned into two virtual drives. The first virtual drive within physical drive D is presented to array control as one of the three drives for the RAID 5 configuration for processing complex 304. The second virtual drive within physical drive D is presented to array control as one of the two drives for the RAID 1 array for processing complex 306.

Thus, referring back to FIG. 6, array control and partitioning logic 610 looks at each physical drive 622 attached to the shared SATA controller 602, and establishes virtual drives from those physical drives according to a desired configuration. That is, the manufacturer of the shared SATA controller 602 (or the array control logic 610) will provide configuration software which: 1) creates virtual partitions for each of the physical drives—unless an entire physical drive will be used by a single OSD; 2) presents the virtual drives to array control for configuration into an array and/or for association with a particular OSD; and 3) associates OSD's (or requests associated with OSD's) with specific virtual drives, or arrays.

For example, in FIG. 6, the array control and partitioning logic 610 is coupled to four disk drives 622. Presuming that the shared SATA controller supports two OSD's, the array control and partitioning logic could create a table that identifies drives A and B as logical drives 0, 1 for OSD 1, and drives C and D as logical drives 0, 1 for OSD 2. Operationally, when a request comes into the shared SATA controller 602 to perform a write to logical drive 1, the array control and partitioning will examine the OSD tag for the request, determine whether the request is from OSD 1, or OSD 2, and then cause the request to be presented to the appropriate physical drive based on that mapping.

Further, within the array control and partitioning logic is one or more link queue's 621, which may or may not have an OSD tracking field 623. The purpose of the link queue 621 is to allow tasks to be built for presentation to the physical drives 622, and to track responses from those drives. More specifically, a queue could be provided for each physical drive 622. Alternatively, a queue could be provided for each array. Or, a queue could be provided for each OSD supported by the shared SATA controller. In each case, the queue structure is provided to optimize a particular activity, whether the activity of concern is throughput on a given link, or array, or throughput by a particular OSD. Further, a single link queue could be provided which contains OSD tracking field 623 to associate each request, pending or completed, with its OSD. Any of these configurations are contemplated by the inventor. What is important is that requests for any given physical link be tracked according to their OSD. Several methods of associating requests to the physical drives with their OSD have been shown, but one skilled in the art will appreciate that other implementations may be utilized without departing from the teachings herein.

Coupled to both the DMA engine(s) 614 and the array control and partitioning logic 610 is arbitration logic 617. The arbitration logic is responsible for selecting resources within the shared SATA controller 602 to satisfy tasks. Thus, the arbitration logic 617 can select the DMA engine 614 to be used, per OSD, or per task. The arbitration logic 617 can also present the tasks to the array control and partitioning logic 617 for presentation to the physical drives according to OSD, or desired link throughput.

Also shown are transport 616, link 618, and physical 620 logic blocks for each SATA disk drive 622 connected to the shared SATA controller 602. Although not shown in FIG. 6, it should be appreciated that multiple devices might be connected to any of the physical links 620, such as if a port replicator is used to extend a link to more than one SATA drive.

In operation, when an OSD requires access to a disk drive, it typically updates a head pointer in a control register 615 associated with that OSD. This alerts the shared SATA controller 602 that it has work to do. The arbitration logic 617 schedules a DMA 614 to retrieve the task from system memory in the OSD and bring that down into the task file 612. On the way in, the task is placed into that OSD's task file 612, or is tagged with its associated OSD. Arbitration logic schedules the task for presentation to the array control and partitioning logic 610. The array control and partitioning logic 610 builds the appropriate request for the task and places it into the link queue 621 associated with the correct physical link. If, for example, the task is a read, transport logic 616 will execute the read and transfer the data from the physical drive into the memory 619. The task in the task file 612 will be updated to let the shared SATA controller 602 know that the data is ready to be transferred over the load-store link 604. Arbitration logic will initiate the DMA transfer to the OSD's system memory. As the data streams out of the core 608, it is associated with the OSD by OSD ID 606 and placed on the load-store link 604.

One skilled in the art will appreciate that the internal representation of core logic 608, DMA engine(s) 614 task file(s) 612, control register 615, memory 619, array control and partitioning logic 610 and arbitration logic 617 are exemplary only. Alternative configurations may exist that are optimized for particular environments. What is illustrated is simply meant to convey that resources within a shared SATA controller may be duplicated to support multiple OSD's, and/or to improve the performance of the shared SATA controller 602. What is necessary, however, is that OSD ID logic 606 exist which can: 1) determine which OSD, or upstream link, is associated with an incoming packet, 2) associate or tag responses for outgoing packets; and 3) correlate internally processed packets with their originating upstream link. In an alternative embodiment, the OSD ID logic 606 may be a CPU which contains all of the functionality described above with respect to FIG. 6, which is then coupled to a non-shared SATA controller. In this configuration, the CPU would be responsible for determining which OSD is associated with an incoming packet, associating responses for outgoing packets with their OSD, and correlating internally processed packets with their originating upstream link.

Furthermore, although not shown, it is possible in some instances to simplify the architecture of the shared SATA controller 600 by combining the task file 612 with the physical links 618. For example, in one embodiment, each of the physical drives 622 might be directly associated with only one OSD. In this scenario, either the array control logic 610, or the arbitration logic 617 could parse incoming requests over the load/store link 604 to determine their OSD, and could place the requests directly on their associated link 618. In this scenario, the task file could be removed from the controller 602, so that the link queue 618 becomes a task file for its physical drive. Alternatively, where a physical drive is shared by two or more OSD's, the array control 610 could express the physical sectors available to each of the OSD's directly to the OSD's, along with the command structure necessary to talk to those physical drives. In this instance, the task file would be redundant. Instead, the OSD's would provide the appropriate commands, and physical sector information, directly to the controller 602, and would be placed directly into the physical link 618 according to the commands.

Figure 7:
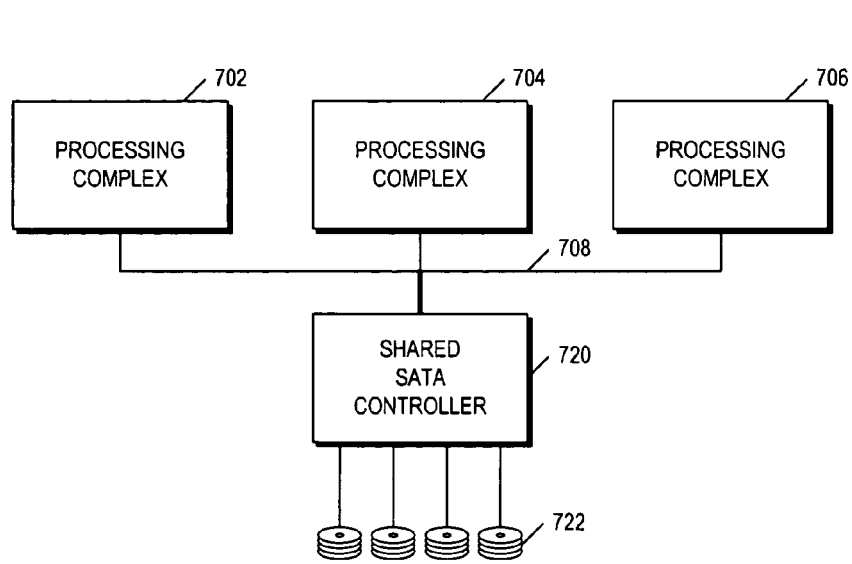
FIG. 7 is an architectural diagram illustrating a shared SATA controller connected to three processing complexes according to an alternative embodiment of the present invention.

Referring now to FIG. 7, a block diagram 700 is shown of three processing complexes 702, 704, 706 coupled directly to an alternative embodiment shared SATA controller 720, which is coupled to a number of disk drives 722. In this embodiment, the load store link 708 between the processing complexes 702, 704, 706 and the shared SATA controller 720 is not OSD aware. Rather, the logic that allows the shared SATA controller to determine which request is associated with which processing complex is embedded within the controller. This is illustrated in FIG. 8, to which attention is now directed.

Figure 8:
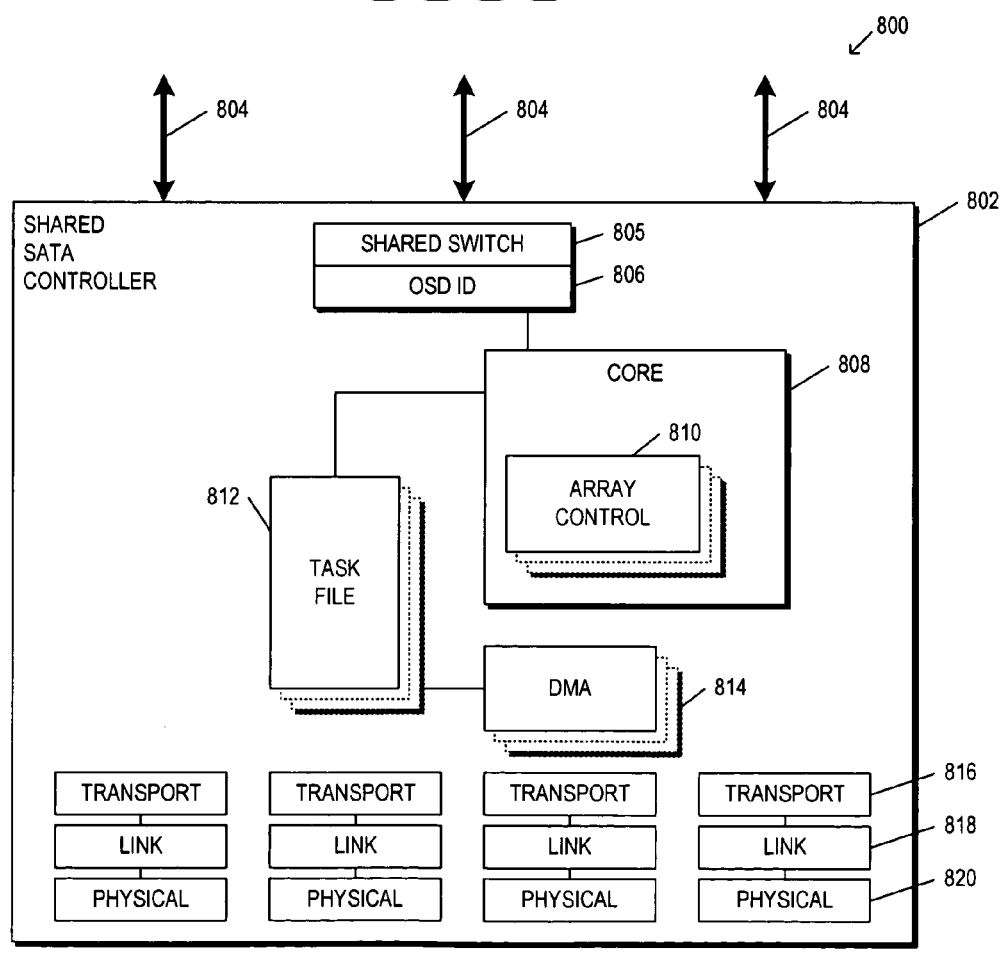
FIG. 8 is an architectural diagram illustrating a shared SATA controller according to an alternative embodiment of the present invention.

FIG. 8 provides an internal logic diagram 800 of an alternative embodiment shared SATA controller 802. In this instance, the shared SATA controller 802 has three upstream ports to interface to non OSD aware links 804. Packets received by the shared SATA controller 802 on any of the links are presented to the shared switch 805 which embeds or associates the packets with their upstream port. They are then provided to the OSD ID logic 806 for operation as described above with reference to FIG. 6. Such operation illustrates that in some environments, it may be advantageous to locate the shared switch within the shared SATA controller 802.

Alternatively, the shared SATA controller 802 may be designed to couple directly to two or more non OSD aware load-store links, and to simply utilize the OSD ID logic 806 to correlate packets with their associated incoming port, and forego the need to provide the shared switch 805 within the shared SATA controller. In this instance, the OSD ID logic 806 provides the functionality of the shared switch in environments where the processing complexes desire to be directly connected to their shared SATA controller.

Figure 9:
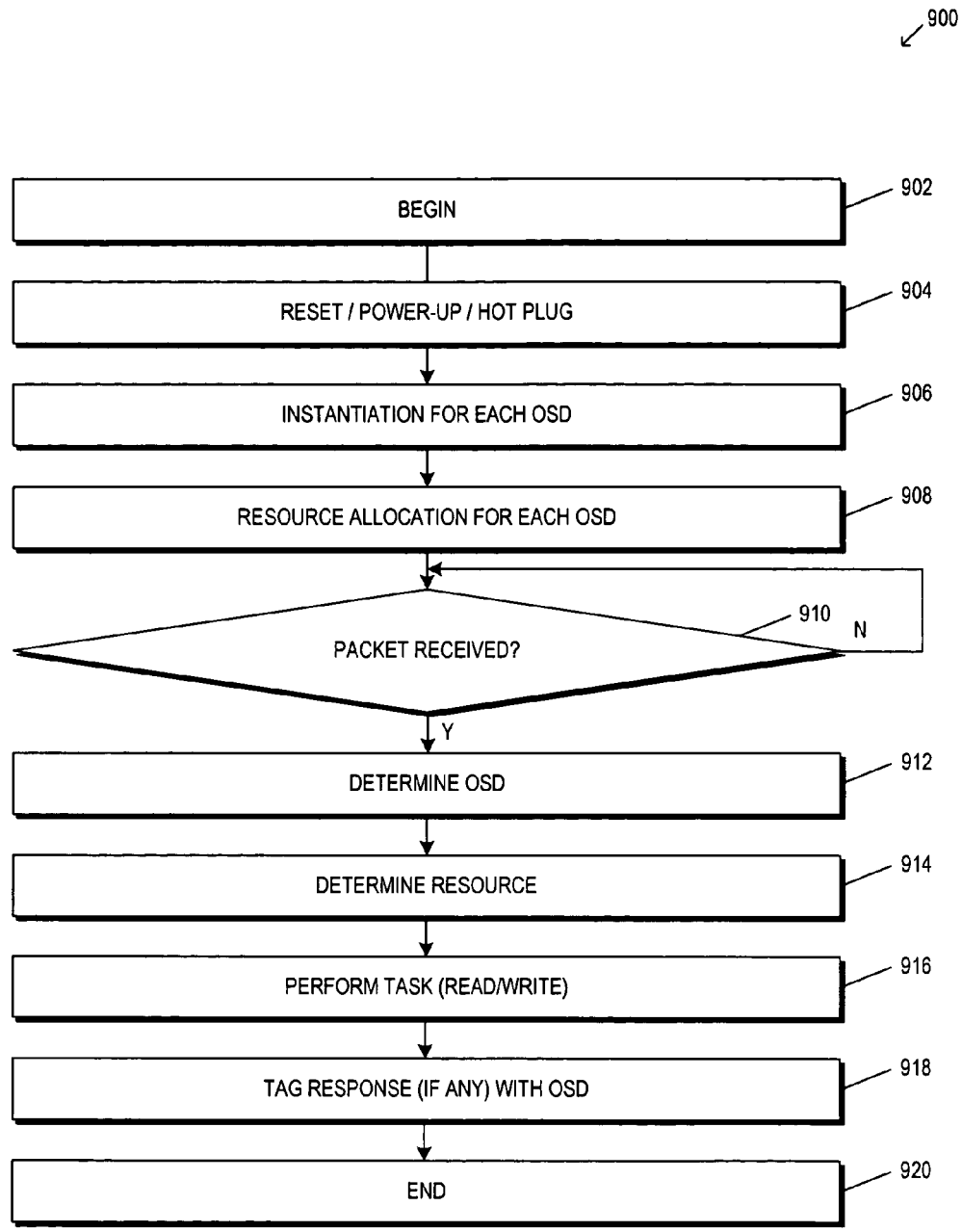
FIG. 9 is a flow chart illustrating the method of the present invention from the perspective of the shared SATA controller.

Referring now to FIG. 9, a flow diagram 900 is provided to illustrate the method of the present invention from the perspective of the shared SATA controller. Flow begins at block 902 and proceeds to block 904.

At block 904, the shared SATA controller is plugged in, or otherwise made aware to its upstream links. Flow then proceeds to block 906.

At block 906, for each upstream link, a discovery process is performed (within PCI-Express, this discovery process is well understood) to allow each upstream link to "see" the shared SATA controller, and to negotiate with it. This negotiation is necessary to allow each operating system to establish the manner of communication between the operating system and the shared SATA controller. From the perspective of the operating system, what this typically means is loading a driver. One such embodiment causes an area of memory within each processing complex to be dedicated for communication with, and data transfer between, the processing complex and the shared SATA controller. Flow then proceeds to block 908.

At block 908, after any of the processing complexes, to which the shared SATA controller is connected, have completed their initialization, the shared SATA controller allocates its internal resources (such as the task file(s)) per OSD. Flow then proceeds to decision block 910.

At decision block 910, a determination is made as to whether a packet has been received. If not, flow returns to decision block 910. If a packet is received, flow proceeds to block 912.

At block 912, the originating OSD (or upstream link) is determined for the packet. Flow then proceeds to block 914.

At block 914, utilizing the OSD determination, resources to be used to process the packet are determined. Flow then proceeds to block 916.

At block 916, the task associated with the packet is performed (such as a load or store, read or write). Flow then proceeds to block 918.

AT block 918, if a response is required (such as for a load), the response is tagged with it associated OSD (or upstream link) and transmitted over the OSD aware load-store link. Flow then proceeds to block 920 where the request is completed.

One skilled in the art will appreciate that the method will vary slightly, depending on the number of OSD's supported by the shared SATA controller, and whether or not the upstream link is OSD aware, or simply inferred by the provision of multiple upstream ports.

Figure 10:
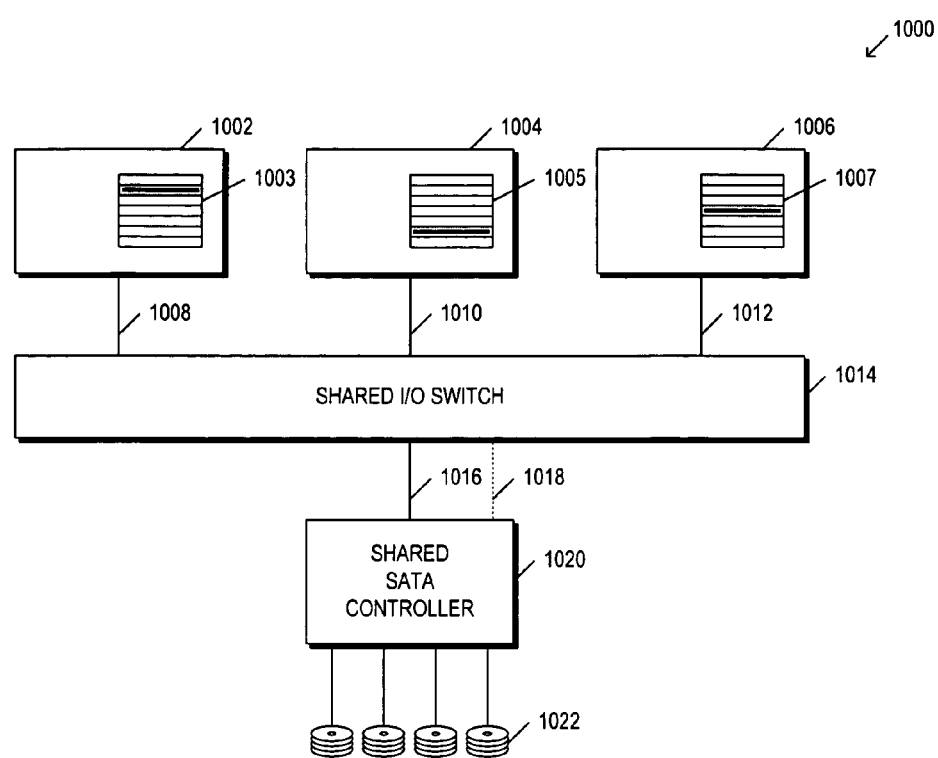
FIG. 10 is a block diagram illustrating three processing complexes, each having their own memory resources, particularly illustrating an area within each of their own memory resources independently configured for communication to the shared SATA controller according to the present invention.

Referring now to FIG. 10, a block diagram is shown, similar to the one described above with respect to FIG. 2. However, in this instance, each of the processing complexes 1002, 1004, 1006 are shown to include their own memory spaces 1003, 1005, 1007, respectively. The purpose of this illustration is to indicate that while each of the processing complexes 1002, 1004, 1006 share the shared SATA controller 1020, the configuration of the shared SATA controller 1020 within each OSD (or processing complex) may be different. That is, from the viewpoint of each processing complex 1002, 1004, 1006, it is not sharing a SATA controller. Rather, it has a dedicated SATA controller for purposes of configuration or use. It is the provision of resources and identification logic within the shared SATA controller 1020, with (or without) the shared I/O switch 1014 which allows a SATA controller to be shared by each processing complex 1002, 1004, 1006 independent of the operating system executing on each processing complex, and without modifying the downstream link typically utilized by the processing complexes to communicate with dedicated SATA controllers.

Figure 11:
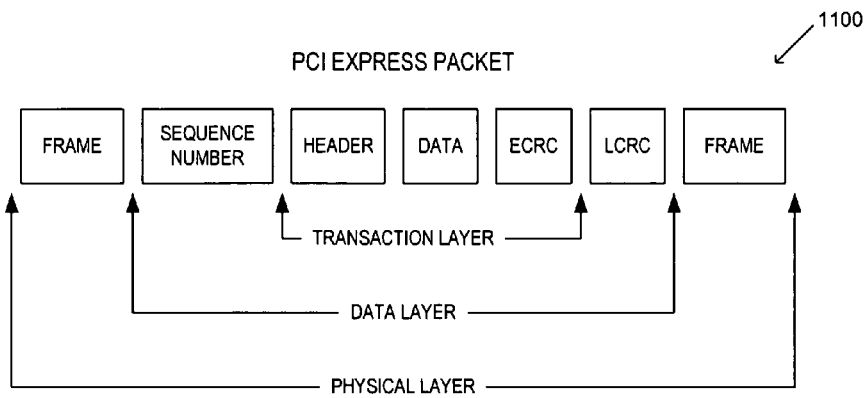
FIG. 11 is a block diagram of a PCI Express+ (Prime) packet for shared I/O according to the present invention.

Referring now to FIG. 11, a block diagram of a PCI Express packet 1100 is shown. The details of each of the blocks in the PCI Express packet 900 are thoroughly described in the PCI Express Base specification 1.0a published by www.pcisig.com, which is incorporated herein by reference for all purposes.

In one embodiment, it is the packet structure of PCI Express, shown in FIG. 11, that is utilized between the processing complexes and the shared I/O switch. In addition, the inventors conceive that multiple processing complexes may be incorporated together (such as one or more independent processing cores within a single processor), where the processing cores are shared I/O aware (i.e., they communicate downstream to a shared I/O switch—whether incorporated or not using PCI Express+). The shared I/O switch then communicates to shared I/O endpoints using PCI Express+.

Figure 12:
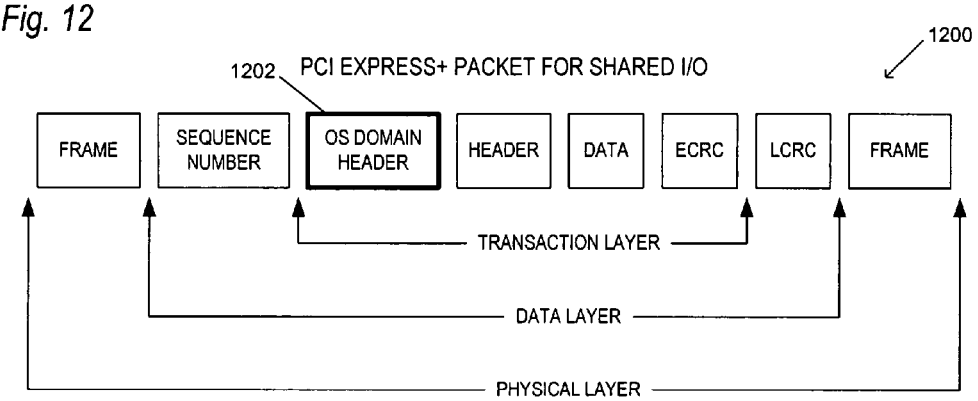
FIG. 12 is a detailed view of an OS (Operating System) Domain Header within the PCI Express+ packet of FIG. 11, according to the present invention.

Referring now to FIG. 12, a block diagram of an improved packet 1200, termed PCI Express+ by the inventors, is shown. More specifically, the PCI Express+ packet 1200 includes an OS Domain Header 1202 within a transaction layer of the packet 1200. Specifics of the OS Domain Header 1202 are provided below in FIG. 13 to which attention is now directed.

Figure 13:
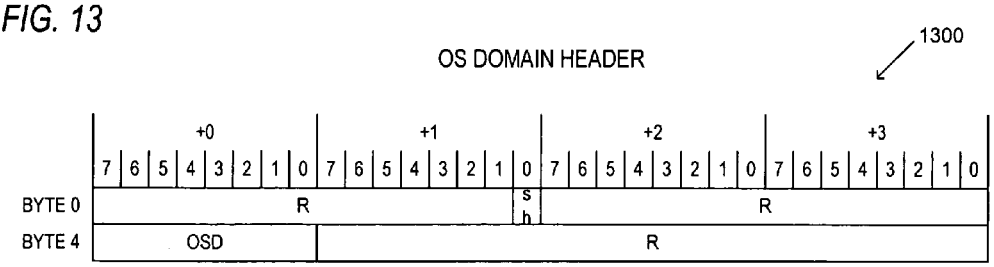
FIG. 13 is a block diagram of an OS Domain Header according to the present invention.

FIG. 13 illustrates one embodiment of an OS domain header 1300 which is encapsulated within a PCI Express packet 1100 to generated a PCI Express+ packet 1200. The OS domain header 1300 is decapsulated from a PCI Express+ packet 1200 to generate a PCI Express packet 1100. In one embodiment, the OS domain header 1300 comprises eight bytes which includes 6+ bytes that are reserved (R), one bit allocated to shared buffer mode (SH), and eight bits allocated to designating an OS domain number (OSD). The OSD is used to associate a transaction packet with its originating or destination operating system domain. An 8-bit OSD field is thus capable of identifying 256 unique OS domains to a shared I/O endpoint device, a shared I/O aware root complex or processing complex, or a shared I/O switch according to the present invention. Although an 8-bit OS domain number field is depicted in the OS domain header 1100 of FIG. 13, one skilled in the art will appreciate that the present invention should not be restricted to the number of bits allocated within the embodiment shown. Rather, what is important is that a means of associating a shared transaction with its origin or destination OS domain be established to allow the sharing and/or partitioning of I/O controllers/devices.

In an alternative embodiment, the OS domain number is used to associate a downstream or upstream port with a PCI Express+ packet. That is, where a packet must traverse multiple links between its origination and destination, a different OSD may be employed for routing of a given packet between a port pair on a given link than is employed for routing of the packet between an port pair on another link. Although different OS domain numbers are employed within the packet when traversing multiple links, such an aspect of the present invention still provides for uniquely identifying the packet so that it remains associated with its intended OS domain.

Additionally, within the OS domain header 1300, are a number of reserved (R) bits. It is conceived by the present inventors that the reserved bits have many uses. Accordingly, one embodiment of the present invention employs one or more of the reserved bits to track coherency of messages within a load-store fabric. Other uses of the reserved bits are contemplated as well. For example, one embodiment envisions use of the reserved (R) bits to encode a version number for the PCI Express+ protocol that is associated with one or more corresponding transactions.

In a PCI Express embodiment, the OS domain header 1300 may be the only additional information included within a PCI Express packet 1100 to form a PCI Express+ packet 1200. Alternatively, the present invention contemplates other embodiments for associating transactions with a given OS domain. For instance, a "designation" packet may be transmitted to a shared I/O device that associates a specified number of following packets with the given OS domain.

In another embodiment, the contents of the OS domain header 1300 are first established by a shared I/O switch by encapsulating the port number of the shared I/O switch that is coupled to an upstream processing complex from which a packet originated, or for which a packet is intended, as the OSD. But other means of associating packets with their origin/destination OS domain are contemplated. One alternative is for each processing complex that is coupled to the shared I/O switch to be assigned a unique ID by the shared I/O switch to be used as the OSD. Another alternative is for a processing complex to be assigned a unique ID, either by the shared I/O switch, or by any other mechanism within or external to the processing complex which is then used in packet transfer to the shared I/O switch (or downstream shared I/O controllers).

Figure 14:
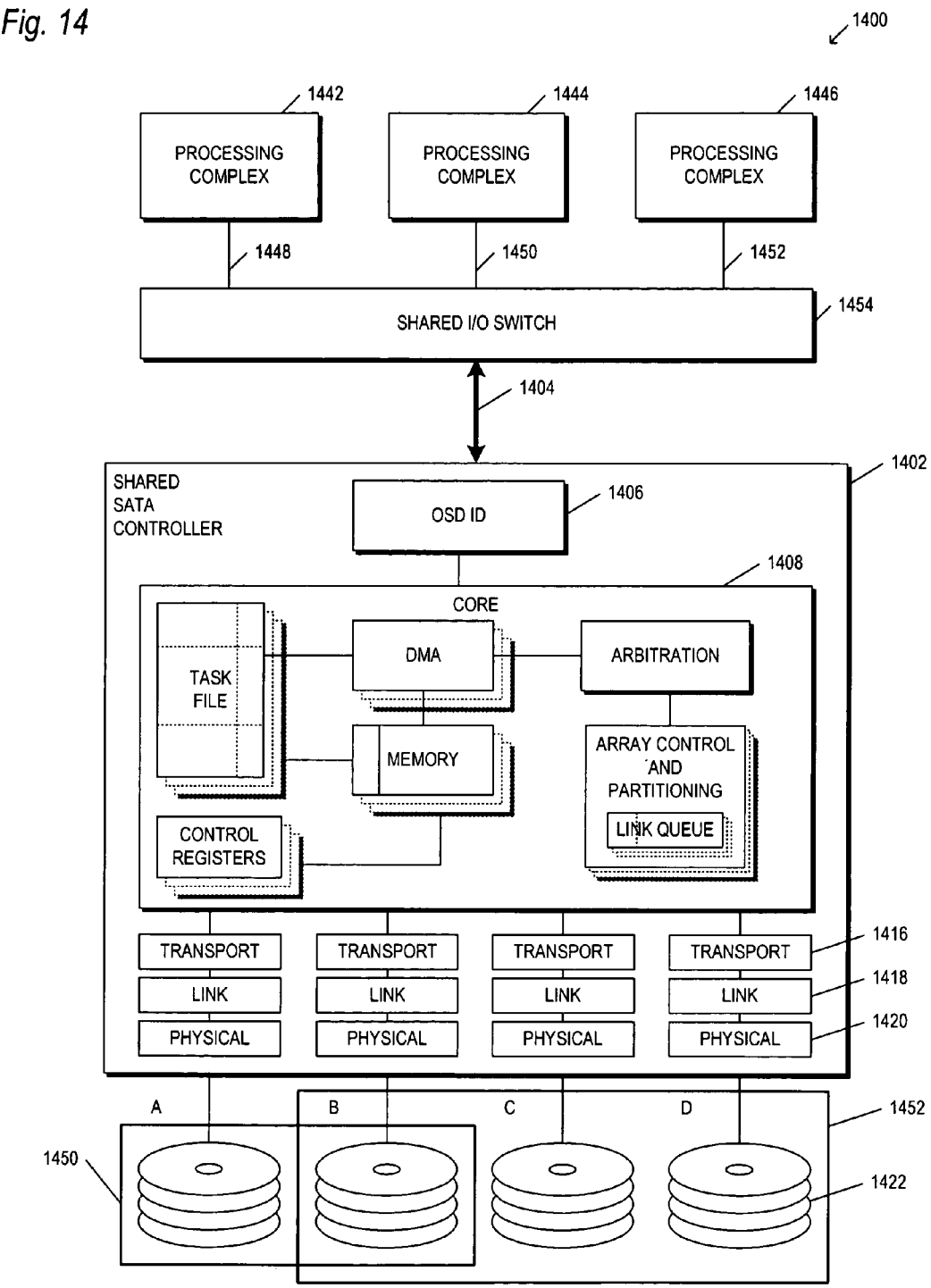
FIG. 14 is a block diagram illustrating request/response flow for multiple OSD's thru a shared SATA controller according to the present invention.

Referring now to FIG. 14, a block diagram 1400 is provided to illustrate request/response flow thru the shared SATA controller 1402 according to the present invention. FIG. 14 combines FIGS. 3A and 6 in a simplified fashion for ease of reference. However, one skilled in the art will appreciate that the details described above with respect to those Figures, and their alternative embodiments, are present within FIG. 14. To illustrate operation of the shared SATA controller 1402, several presumptions are made. First, presume that drives A, B, C, D are each 200 gigabyte SATA drives. Further, presume that the array control has partitioned 100 gigabytes each of drives A and B to be in a RAID 1 configuration associated with processing complex 1442 as its drive "0". And, the array control has partitioned 100 gigabytes each of drives B, C, D to be in a RAID 5 configuration associated with processing complex 1444 as it's drive "1". One skilled in the art will appreciate that 100 gigabytes of drives A, C and D are unallocated, and are therefore available for allocation to one or more of the processing complexes 1442-1446. Additionally, presume that the core 1408 contains a single DMA engine, and a single task file, capable of storing two tasks. One skilled in the art will appreciate that all of these presumptions are not meant to limit the scope of the invention, but rather, are simply meant to focus attention to data flow in a specific scenario.

Now, presume that processing complex 1442 wishes to write a block of data to its drive "0". Also, presume that processing complex 1444 wishes to read a block of data from its drive "1". In one embodiment, flow occurs as follows.

Both processing complexes 1442 and 1444 alert the shared SATA controller 1402 that they have work to be performed, in any of the ways above described. In one embodiment, they each perform a write to a control register that is associated with their OSD. Arbitration logic monitors the control register(s) and initiates the DMA engine to retrieve the requests into the task file. As each task is retrieved from the processing complexes 1442, 1444 they are tagged with their associated OSD. Arbitration logic then selects which of the outstanding tasks in the task file to work on. In the case of the write for processing complex 1442, arbitration logic must cause the DMA engine to DMA the data to be written from the processing complex 1442 into the controller's memory. When the data comes into the memory, it must be tagged with its associated task in the task file, and thus its associated OSD. In the case of the read for processing complex 1444, arbitration logic must cause the transport link 1416 to transfer a block of data from logical drive "1" for the OSD associated with processing complex 1444, place that data in the memory, and associate that data with its associated task and OSD.

Once enough of the data to form an SATA packet has been retrieved from processing complex 1442, arbitration logic communicates with array control and partitioning logic to execute a write of the data to logical drive "0" for the OSD associated with processing complex 1442. Arbitration logic has configured physical drives A and B as a 100 gigabyte logical drive "0" that is mirrored. Array control contains tables (not shown) which provide the necessary LUN/sector mapping of physical sectors on the drives A and B to the logical sectors viewed by the OSD for processing complex 1442. In this instance, array control causes a write of the block of data in memory to both drives A and B to the physical sectors established during RAID configuration for processing complex 1442. Once the write is completed, the task associated with processing complex 1442 is marked complete.

To perform the read for processing complex 1444, arbitration logic causes the DMA engine to present the read to the array control and partitioning logic. Array control determines that the read to drive "1" for processing complex 1444 is really a read from logical partitions of physical drives B, C, D associated with the OSD of processing complex 1444. Array control therefore causes reads to be presented on the transport layers of physical drives B, C, D according to the physical sectors that have been configured for the read to drive "1". Data from the read flows into the memory. Arbitration logic causes the DMA engine to DMA this data to processing complex 1444, which when complete, updates the task file to mark the read task as complete.

While not particularly described, it should be appreciated that the load/store link 1404 requires that each request and response transmitted from the shared SATA controller 1402 to the upstream processing complexes 1442-1446, and vice versa, are tagged with the OSD header described above. The OSD ID logic 1408 performs this association. And, within the core 1408, each outstanding task (and its associated data, if any) are tagged with their corresponding OSD. Further, the array control contains LUN/sector mapping for each OSD to associate a logical drive (such as "0") to a logical partition on one or more physical drives, as described above. And, while not described, although existing SATA drives 1422 only respond to one request at a time, it is envisioned that if SATA drives become smarter, and can manage multiple requests, either in order, or out of order, that such requests need to be tagged not only with a request ID, but also with an associated OSD. Alternatively, array control and partitioning logic must associate requests to any physical link not only per request, but also per OSD.

While not particularly shown, one skilled in the art will appreciate that many alternative embodiments may be implemented which differ from the above description, while not departing from the scope of the invention as claimed. For example, the context of the processing complexes, i.e., the environment in which they are placed has not been described because such discussion is exhaustively provided in the parent application(s). However, one skilled in the art will appreciate that the processing complexes of the present application should be read to include at least one or more processor cores within a SOC, or one or more processors within a board level system, whether the system is a desktop, server or blade. Moreover, the location of the shared I/O switch, whether placed within an SOC, on the backplane of a blade enclosure, or within a shared SATA controller should not be controlling. Rather, it is the provision of an SATA controller which can process requests from multiple processing complexes, as part of their load-store domain to which the present invention is directed. This is true whether the OSD ID logic is within the shared SATA controller, or whether the shared SATA controller provides multiple upstream OSD aware (or non OSD aware) ports. Further, it is the tracking of outstanding requests such that results from processing are accurately associated with their upstream links that is important.

Additionally, the above discussion has described the present invention within the context of three processing complexes communicating with the shared SATA controller. The choice of three processing complexes was simply for purposes of illustration. The present invention could be utilized in any environment that has one or more processing complexes (servers, CPU's, etc.) that require access to data storage.

Further, the present invention has utilized a shared I/O switch to associate and route packets from processing complexes to the shared SATA controller. It is within the scope of the present invention to incorporate the features of the present invention within a processing complex (or chipset) such that everything downstream of the processing complex is shared I/O aware (e.g., PCI Express+). If this were the case, the shared SATA controller could be coupled directly to ports on a processing complex, as long as the ports on the processing complex provided shared I/O information to the shared SATA controller, such as OS Domain information. What is important is that the shared SATA controller be able to recognize and associate packets with origin or upstream OS Domains, whether or not a shared I/O switch is placed external to the processing complexes, or resides within the processing complexes themselves.

And, if the shared I/O switch were incorporated within the processing complex, it is also possible to incorporate one or more shared SATA controllers into the processing complex. This would allow a single processing complex to support multiple upstream OS Domains while packaging everything necessary to talk to fabrics outside of the load/store domain (Ethernet, Fiber Channel, SATA, etc.) within the processing complex. Further, if the upstream OS Domains were made shared I/O aware, it is also possible to couple the domains directly to the SATA controllers, all within the processing complex.

And, it is envisioned that multiple shared I/O switches according to the present invention be cascaded to allow many variations of interconnecting processing complexes with downstream I/O devices such as the shared SATA controller. In such a cascaded scenario, an OS Header may be global, or it might be local. That is, it is possible that a local ID be placed within an OS Header, the local ID particularly identifying a packet, within a given link (e.g., between a processing complex and a switch, between a switch and a switch, and/or between a switch and an endpoint). So, a local ID may exist between a downstream shared I/O switch and an endpoint, while a different local ID may be used between an upstream shared I/O switch and the downstream shared I/O switch, and yet another local ID between an upstream shared I/O switch and a root complex. In this scenario, each of the switches would be responsible for mapping packets from one port to another, and rebuilding packets to appropriately identify the packets with their associating upstream/downstream port.

It is also envisioned that the addition of an OSD header within a load-store fabric, as described above, could be further encapsulated within another load-store fabric yet to be developed, or could be further encapsulated, tunneled, or embedded within a channel-based fabric such as Advanced Switching (AS) or Ethernet. AS is a multi-point, peer-to-peer switched interconnect architecture that is governed by a core AS specification along with a series of companion specifications that define protocol encapsulations that are to be tunneled through AS fabrics. These specifications are controlled by the Advanced Switching Interface Special Interest Group (ASI-SIG), 5440 SW Westgate Drive, Suite 217, Portland, Oreg. 97221 (Phone: 503-291-2566). For example, within an AS embodiment, the present invention contemplates employing an existing AS header that specifically defines a packet path through a I/O switch according to the present invention. Regardless of the fabric used downstream from the OS domain (or root complex), the inventors consider any utilization of the method of associating a shared I/O endpoint with an OS domain to be within the scope of their invention, as long as the shared I/O endpoint is considered to be within the load-store fabric of the OS domain.

Further, the above discussion has been directed at an embodiment of the present invention within the context of the SATA disk protocol. This was chosen to illustrate the novelty of the present invention with respect to providing a shareable controller for access to disk drives (or other end devices which utilize a disk protocol interface). One skilled in the art should appreciate that other disk protocols such as IDE, EIDE, SCSI, and SAS are encompassed within the above discussion to allow for sharing controllers for such protocols among multiple processing complexes. It is not the specific protocol to which this invention is directed. Rather, it is the sharing of a controller by multiple processing complexes which is of interest. Further, it is the ability to allocate one or more virtual partitions to one or more processing complexes via a load-store link to which the present invention is directed.

Although the present invention and its objects, features and advantages have been described in detail, other embodiments are encompassed by the invention. In addition to implementations of the invention using hardware, the invention can be implemented in computer readable code (e.g., computer readable program code, data, etc.) embodied in a computer usable (e.g., readable) medium. The computer code causes the enablement of the functions or fabrication or both of the invention disclosed herein. For example, this can be accomplished through the use of general programming languages (e.g., C, C++, JAVA, and the like); GDSII databases; hardware description languages (HDL) including Verilog HDL, VHDL, Altera HDL (AHDL), and so on; or other programming and/or circuit (i.e., schematic) capture tools available in the art. The computer code can be disposed in any known computer usable (e.g., readable) medium including semiconductor memory, magnetic disk, optical disk (e.g., CD-ROM, DVD-ROM, and the like), and as a computer data signal embodied in a computer usable (e.g., readable) transmission medium (e.g., carrier wave or any other medium including digital, optical or analog-based medium). As such, the computer code can be transmitted over communication networks, including Internets and intranets. It is understood that the invention can be embodied in computer code (e.g., as part of an IP (intellectual property) core, such as a microprocessor core, or as a system-level design, such as a System on Chip (SOC)) and transformed to hardware as part of the production of integrated circuits. Also, the invention may be embodied as a combination of hardware and computer code.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A shareable disk storage controller comprising:
   logic for coupling the controller to one or more storage devices, wherein the shareable disk storage controller is shared within the load-store architecture of a plurality of operating system domains;
   core logic, coupled to said logic, for managing data transfers to/from said one or more storage devices; and
   operating system domain identification logic, coupled to said core logic, for:
      receiving requests from the plurality of operating system domains; and
      determining which of the plurality of operating system domains is associated with each of said requests;
   wherein by determining which of the plurality of operating system domains is associated with each of said requests, the shareable disk storage controller supports requests from each of the plurality of operating system domains;
   wherein the load-store architecture comprises resources directly accessible by the plurality of operating system domains using load and/or store instructions, said resources comprising memory spaces for each of the plurality of operating system domains; and
   wherein upon initialization of the shareable disk storage controller by each of the plurality of operating system domains, a portion of said memory spaces for each of the plurality of operating system domains is allocated for communication to the shareable disk storage controller.

2. The shareable disk storage controller as recited in claim 1 wherein the shareable disk storage controller comprises a shareable SATA controller.

3. The shareable disk storage controller as recited in claim 1 wherein each of the plurality of operating system domains comprises: a processing complex; and memory, coupled to said processing complex.

4. The shareable disk storage controller as recited in claim 1 wherein said logic comprises: transport layer logic; link layer logic, coupled to said transport layer logic; and physical layer logic, coupled to said link layer logic, said physical layer logic providing the physical connection to at least one of said one or more storage devices.

5. The shareable disk storage controller as recited in claim 1 wherein said logic is coupled to said core logic for sending data between the shareable disk storage controller and said one or more storage devices.

6. The shareable disk storage controller as recited in claim 1 wherein said one or more storage devices comprise hard disks.

7. The shareable disk storage controller as recited in claim 6 wherein said hard disks comprise SATA disk drives.

8. The shareable disk storage controller as recited in claim 1 wherein said core logic further comprises: array control logic for managing two or more of said storage devices in an array configuration.

9. The shareable disk storage controller as recited in claim 8 wherein said array configuration comprises a RAID (Redundant Array of Inexpensive Disks) configuration.

10. The shareable disk storage controller as recited in claim 9 wherein said RAID configuration comprises: Raid levels 0, 1, 2, 3, 4, 5.

11. The shareable disk storage controller as recited in claim 1 wherein said core logic further comprises: a plurality of array control logic for managing two or more of said storage devices in an array configuration, for a plurality of the plurality of operating system domains.

12. The shareable disk storage controller as recited in claim 1 further comprising: one or more task files, coupled to said core logic, associated with the plurality of operating system domains supported by the shareable disk storage controller.

13. The shareable disk storage controller as recited in claim 12 wherein said one or more task files comprise: a task entry, having a task portion and an OSD portion.

14. The shareable disk storage controller as recited in claim 13 wherein said task portion holds a task defining work to be done by the controller, and said OSD portion stores an OSD identifier.

15. The shareable disk storage controller as recited in claim 14 wherein said OSD identifier associates said task with one of the plurality of operating system domains.

16. The shareable disk storage controller as recited in claim 12 wherein said one or more task files comprise: a first task file associated with a first one of the plurality of operating system domains; and a second task file associated with a second one of the plurality of operating system domains; wherein tasks originating from said first one of the plurality of operating system domains are stored in said first task file; and wherein tasks originating from said second one of the plurality of operating system domains are stored in said second task file.

17. The shareable disk storage controller as recited in claim 1 further comprising: one or more DMA (direct-memory-access) engines, coupled to said core logic, for use by said core logic to handle data transfers for the plurality of operating system domains.

18. The shareable disk storage controller as recited in claim 1 wherein said operating system domain identification logic is coupled to a multi-OSD aware load-store fabric.

19. The shareable disk storage controller as recited in claim 18 wherein said multi-OSD aware load store fabric comprises PCI-Express+.

20. The shareable disk storage controller as recited in claim 1 further comprising: a shared switch, coupled to said operating system domain identification logic, and coupled to a plurality of load-store fabrics, for receiving requests from said plurality of load-store fabrics and for presenting said requests to said operating system domain identification logic.

21. The shareable disk storage controller as recited in claim 20 wherein said plurality of load-store fabrics do not contain additional header information for identifying requests with one of the plurality of operating system domains.

22. The shareable disk storage controller as recited in claim 20 wherein said plurality of load-store fabrics comprise PCI-Express.

23. A Serial ATA (SATA) controller comprising:
a plurality of interfaces, for coupling the controller to a plurality of disk drives;
core logic, coupled to the plurality of interfaces, said core logic for managing requests for data transfers to/from said plurality of disk drives; and
operating system domain identification logic (OSD ID), coupled to said core logic, for receiving requests from the plurality of processing complexes, and for determining for each of said received requests, which processing complex it is associated with;
wherein the controller is shareable by the plurality of processing complexes, allowing each of the plurality of processing complexes to communicate with the controller within its own load-store architecture;
wherein each load-store architecture of the plurality of processing complexes comprises resources directly accessible by the plurality of processing complexes using load and/or store instructions, said resources comprising memory spaces for each of the plurality of processing complexes; and
wherein upon initialization of the controller by each of the plurality of processing complexes, a portion of said memory spaces for each of the plurality of processing complexes is allocated for communication to the controller.

24. The Serial ATA (SATA) controller as recited in claim 23 wherein each of the plurality of processing complexes comprise: one or more processing cores executing one or more operating systems; and memory, coupled to the one or more processing cores.

25. The Serial ATA (SATA) controller as recited in claim 23 wherein each of the plurality of processing complexes comprise: a processing core; and memory, coupled to the processing core.

26. The Serial ATA (SATA) controller as recited in claim 23 wherein each of the plurality of processing complexes utilizes PCI-Express as one of its load-store fabrics.

27. The Serial ATA (SATA) controller as recited in claim 23 wherein each of the plurality of processing complexes utilizes PCI-Express+ as one of its load-store fabrics.

28. The Serial ATA (SATA) controller as recited in claim 23 wherein said core logic further comprises array control logic, for managing one or more arrays among said plurality of disk drives.

29. The Serial ATA (SATA) controller as recited in claim 28 wherein said one or more arrays comprise RAID arrays.

30. The Serial ATA (SATA) controller as recited in claim 28 wherein said array control logic is configurable to provide a first array to support a first one of the plurality of processing complexes, and a second array to support a second one of the plurality of processing complexes.

31. The Serial ATA (SATA) controller as recited in claim 30 wherein said first array comprises a first set of the plurality of disk drives, and said second array comprises a second set of the plurality of disk drives.

32. The Serial ATA (SATA) controller as recited in claim 31 wherein said first set and said second set are physically distinct disk drives.

33. The Serial ATA (SATA) controller as recited in claim 31 wherein said first set and said second set are logically distinct disk drives, but are not necessarily physically distinct disk drives.

34. The Serial ATA (SATA) controller as recited in claim 32 wherein said OSD ID is coupled to an OSD aware load-store fabric.

35. The Serial ATA (SATA) controller as recited in claim 34 wherein said OSD aware load-store fabric comprises PCI-Express+.

36. The Serial ATA (SATA) controller as recited in claim 34 wherein said OSD aware load-store fabric comprises a load-store fabric that associates each packet with a particular one of the plurality of processing complexes.

37. The Serial ATA (SATA) controller as recited in claim 36 wherein the association is provided by adding header information to each packet.

38. The Serial ATA (SATA) controller as recited in claim 36 wherein the association is provided for each packet outside of said load-store fabric.

39. The Serial ATA (SATA) controller as recited in claim 23 further comprising: a shared switch, coupled to said OSD ID, and to the plurality of processing complexes, said shared switch for receiving packets from the plurality of processing complexes, and for associating each of said packets with the processing complex it is associated with.

40. The Serial ATA (SATA) controller as recited in claim 39 wherein said shared switch passes each of the packets, along with their association, to said OSD ID.

41. Serial ATA (SATA) controller as recited in claim 39 wherein said shared switch receives packets along with their association from said OSD ID, identifies which of the processing complexes the packets are associated with, and transmits the packets to their associated processing complex.

42. A computing environment comprising:
at least one disk drive, coupled to a SATA controller;
a shared switch, coupled between processing complexes and the SATA controller, the processing complexes comprising a first processing complex and a second processing complex, said shared switch associating each packet from the processing complexes with its originating processing complex, and forwarding said each packet, along with its association, to the SATA controller;
the SATA controller comprising operating system domain identification logic (OSD ID) for receiving said each packet from said shared switch, for determining the association, and for processing said each packet for its associated processing complex;
wherein the first processing complex and second processing complex share the SATA controller, the SATA controller communicating with each of the first and second processing complexes within its respective load-store domain; and
wherein neither the first processing complex nor the second processing complex is necessarily aware that it is sharing the SATA controller;
wherein the load-store domain comprises resources directly accessible by the plurality of processing complexes using load and/or store instructions, said resources comprising memory spaces for each of the processing complexes; and
wherein upon initialization of the shareable disk storage controller by each of the processing complexes, a portion of said memory spaces for each of the processing complexes is allocated for communication to the storage controller.

43. The computing environment as recited in claim 42 wherein the first and second processing complexes each comprise: a processor; and memory coupled to said processor.

44. The computing environment as recited in claim 42 wherein the SATA controller, upon initialization by the first processing complex, communicates with the first processing complex utilizing memory within its load-store domain, and upon initialization by the second processing complex, communicates with the second processing complex utilizing memory within its load-store domain.

45. The computing environment as recited in claim 42 wherein said at least one disk drive is shared by the first and second processing complexes.

46. The computing environment as recited in claim 42 wherein the first and second processing complexes are coupled together to provide redundancy.

47. The computing environment as recited in claim 46 wherein the first processing complex utilizes said at least one disk drive, and the second processing complex utilizes a second disk drive.

48. The computing environment as recited in claim 47 wherein if either the first or second processing complex fails, the SATA controller makes both said at least one disk drive, and said second disk drive available to the non-failing processing complex.

49. The computing environment as recited in claim 42 wherein said shared switch resides on-chip with the first and second processing complexes.

50. The computing environment as recited in claim 42 wherein said shared switch resides on the SATA controller.

51. A serial ATA controller which is map-able to one or more processing complexes, the controller comprising:
  one or more interfaces to one or more disk drives;
  core logic, coupled to said one or more interfaces; and
  a load-store fabric interface, coupled to said core logic, for interfacing the controller to a load-store fabric that identifies packets with their associated processing complex, the load store fabric interface configurable to process packets from a first processing complex, said load-store fabric interface being reconfigurable to process packets from a second processing complex;
  the controller being shareable by the first processing complex and the second processing complex, allowing each of the first and second processing complexes to communicate with the controller within its own load-store architecture;
  wherein each load-store architecture of the processing complexes comprises resources directly accessible by the processing complexes using load and/or store instructions, said resources comprising memory spaces for each of the processing complexes; and
  wherein upon initialization of the controller by each of the processing complexes, a portion of said memory spaces for each of the processing complexes is allocated for communication to the controller.

52. The serial ATA controller as recited in claim 51 wherein said load-store fabric interface is reconfigurable without requiring said interface to be hard reset.

53. The serial ATA controller as recited in claim 51 wherein said hard reset requires re-powering said controller.

54. A method for sharing a serial ATA (SATA) controller by a plurality of processing complexes, the method comprising:
  initializing the SATA controller into the load-store resources of each of the plurality of processing complexes;
  associating packets from each of the plurality of processing complexes with their originating processing complex;
  transmitting the packets to the SATA controller;
  identifying for the SATA controller, which of the plurality of processing complexes is associated with the transmitted packets;
  processing each of the transmitted packets within SATA controller; and
  associating responses to said processing with their appropriate processing complex; and
  sharing the SATA controller by the plurality of processing complexes, allowing each of the plurality of processing complexes to communicate with the SATA controller within its own load-store architecture;
  wherein each load-store resource of the plurality of processing complexes comprises resources directly accessible by the plurality of processing complexes using load and/or store instructions, said resources comprising memory spaces for each of the plurality of processing complexes; and
  wherein upon initialization of the controller by each of the plurality of processing complexes, a portion of said memory spaces for each of the plurality of processing complexes is allocated for communication to the controller.

55. The method as recited in claim 54 wherein said initializing causes a driver within each of the processing complexes, that is associated with the SATA controller, to instantiate resource space into memory space of each of the plurality of processing complexes.

56. The method as recited in claim 54 wherein said step of associating packets from each of the plurality of processing complexes comprises adding header information which associates a packet with its upstream processing complex.

57. The method as recited in claim 56 wherein an associated packet contains header information, in addition to original packet information, so that the SATA controller can distinguish which packets are from which processing complex.

\* \* \* \* \*